United States Patent
Gang et al.

(10) Patent No.: US 11,884,564 B2
(45) Date of Patent: Jan. 30, 2024

(54) AMORPHOUS COBALT-INHERENT SILICON OXIDE CATALYST

(71) Applicant: University of Louisiana at Lafayette, Lafayette, LA (US)

(72) Inventors: Daniel Dianchen Gang, Lafayette, LA (US); Qiyu Lian, Lafayette, LA (US); Mark E. Zappi, Lafayette, LA (US); William E. Holmes, Lafayette, LA (US)

(73) Assignee: University of Louisiana at Lafayette, Lafayette, LA (US)

( * ) Notice: Subject to any disclaimer, the term of this patent is extended or adjusted under 35 U.S.C. 154(b) by 173 days.

(21) Appl. No.: 17/390,254

(22) Filed: Jul. 30, 2021

(65) Prior Publication Data
US 2023/0046975 A1    Feb. 16, 2023

(51) Int. Cl.
| | | |
|---|---|---|
| *B01J 21/08* | (2006.01) | |
| *C02F 1/72* | (2023.01) | |
| *B01J 23/75* | (2006.01) | |
| *B01J 35/02* | (2006.01) | |
| *B01J 37/04* | (2006.01) | |
| *B01J 37/06* | (2006.01) | |
| *B01J 37/00* | (2006.01) | |
| *B01J 35/10* | (2006.01) | |
| *B01J 37/08* | (2006.01) | |
| *C02F 101/36* | (2006.01) | |
| *C02F 101/34* | (2006.01) | |

(52) U.S. Cl.
CPC ............. *C02F 1/725* (2013.01); *B01J 21/08* (2013.01); *B01J 23/75* (2013.01); *B01J 35/026* (2013.01); *B01J 35/1023* (2013.01); *B01J 35/1047* (2013.01); *B01J 35/1061* (2013.01); *B01J 37/009* (2013.01); *B01J 37/04* (2013.01); *B01J 37/06* (2013.01); *B01J 37/082* (2013.01); *C02F 1/722* (2013.01); *C02F 2101/345* (2013.01); *C02F 2101/36* (2013.01)

(58) Field of Classification Search
CPC ... B01J 21/08; B01J 23/75; B01J 35/02; B01J 35/10; B01J 37/00; B01J 37/04; B01J 37/06; B01J 37/08; C02F 1/72
See application file for complete search history.

(56) References Cited

FOREIGN PATENT DOCUMENTS

CN          113244920 A  *  8/2021  ............. B01D 53/78

OTHER PUBLICATIONS

Ghanbari et al. Chemical Engineering Journal 310 (2017) 41-62 (Year: 2017).*

* cited by examiner

*Primary Examiner* — Sharon Pregler
(74) *Attorney, Agent, or Firm* — Kean Miller LLP; Brian J. Servé; Lauren J. Rucinski

(57) ABSTRACT

Claimed herein is a method of applying amorphous Co—SiOx to activate PMS and produce $SO_4^{\cdot-}$ due to the formation of Co(II)-$O_v$ pairs via the substitution of Si by Co. The inherent Co significantly change the electronic structure of O and Si atoms in the Co—SiOx via final state effects and increase the conductivity in terms of more effective electron transfers. The claimed method using Co—SiOx functions as a more effective oxidative catalyst for the faster degradation of pollutants. The simplicity of the synthetic procedures indicates that the conductive Co—SiOx could be used for the activation of PMS and other electrochemical applications on a wider scale.

9 Claims, 18 Drawing Sheets

AMORPHOUS COBALT-INHERENT SILICON OXIDE CATALYST

CROSS REFERENCE TO RELATED APPLICATIONS

This application claims priority to U.S. Provisional Application No. 63/060,324 filed on Aug. 3, 2020 and entitled "METHOD OF MANUFACTURING AN AMORPHOUS COBALT-INHERENT SILICON OXIDE AS A HIGHLY ACTIVE HETEROGENEOUS CATALYST IN ACTIVATION OF PEROXYMONOSULFATE FOR RAPID DEGRADATION OF ORGANIC POLLUTANTS INCLUDING 2,4-DICHLOROPHENOLS."

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM

Not Applicable.

DESCRIPTION OF THE DRAWINGS

The drawings constitute a part of this specification and include exemplary embodiments of the AMORPHOUS COBALT-INHERENT SILICON OXIDE AS A CATALYST, which may be embodied in various forms. It is to be understood that in some instances, various aspects of the invention may be shown exaggerated or enlarged to facilitate an understanding of the invention. Therefore, the drawings may not be to scale.

FIG. 1 (B) shows Small- and wide-angle XRD patterns of the $SiO_2$ and Co—SiOx.

BACKGROUND

Figure 1A:
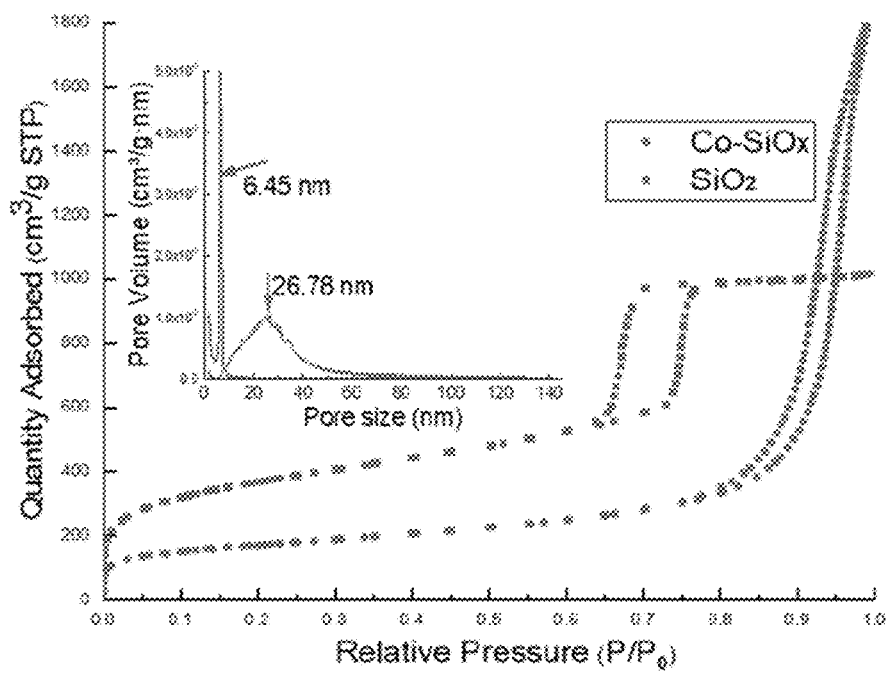
FIG. 1 (A) shows BET surface area and pore size distribution.

Advanced oxidation processes (AOPs) are commonly regarded as one of the innovative technologies for the degradation of organic contaminants in water. Among them, sulfate radical-based advanced oxidation processes (SR-AOPs) capable of activating peroxymonosulfate (PMS) have garnered increasing interest in the field due to the generation of highly reactive sulfate radicals ($SO_4 \cdot^-$).

The $SO_4 \cdot^-$ produced in the activated PMS system exhibits a high oxidation reactivity with a redox potential of $E^0(SO_4 \cdot^-/SO_4^{2-})$=2.5-3.1 V, a broader range of operating pH values (2-9), and a long half-life (30-40 μs). This high oxidation potential places the SR-AOPs among the highest known while the wide operating pH range offers more flexibility than most reported AOPs.

Various approaches have been proven to be promising techniques for the activation of PMS, such as heat, ultraviolet radiation, ultrasound, carbon catalysts, and transition metal incorporated catalysts. Among them, transition metal incorporated catalysts have been commonly considered one of the most efficient approaches for activating PMS. Cobalt-incorporated catalysts offer oxidative water treatment performs among the best of those reported for activating PMS.

Various cobalt-incorporated catalysts have been investigated and developed for the activation of PMS in the prior art, such as cobalt oxides-based catalysts or cobalt oxides-supported catalysts. The cobalt doped hydroxyapatite, 3D heterostructure $Co_3O_4$/NF, $Co_3S_4$/GN, and yolk-shell $Co_3O_4$/MOFs have been successfully prepared and reported for the degradation of various organic contaminants by activating PMS in aqueous solutions. With most of these catalysts, the crystalline cobalt oxides were commonly incorporated onto the surface and/or inner structure of the supporting material with excellent conductive properties.

The crystalline cobalt oxides on the surface of the supporting material both creates and stabilizes surficial and/or bulk oxygen vacancies along with preventing surface passivation. These oxygen vacancies are efficient to promote the diffusion of oxygen-ions and the separation of electrons and holes, further enhancing the electronic conductivity of the catalysts. Consequently, active sites are formed by the combined effects of crystalline cobalt oxides and oxygen vacancies significantly accelerating the charge-transfer of catalysts to promote catalytic performance.

The current prior art has investigated the crystalline cobalt oxides incorporated catalysts for various applications; however, the amorphous cobalt-doped catalysts have not been used by the prior art, despite their potential promising properties.

This invention provides a novel catalyst for catalytic activation of PMS in amorphous cobalt-inherent silicon oxide (Co—SiOx).

Amorphous catalysts are regarded as chemically inherent heterogeneous. In contrast, conventional crystalline catalysts are very heterogeneous in terms of surface properties. Moreover, amorphous catalysts are more prevalent than crystalline catalysts with commercial applications, chosen not only due to the lower economic costs and tunable porosities but also due to their significantly better catalytic behavior and productivities.

Amorphous silica-alumina has been widely applied in hydrocarbon cracking and biomass conversion. The structural chemistry of amorphous silica-alumina has been demonstrated to be in the form of mixed oxides rather than a mixture of oxides via isomorphic alumina substitution for Si atoms. Consequently, the surface chemistry of amorphous silica-alumina significantly differs from that of crystalline aluminosilicates by exhibiting a stronger Lewis acidity which contributes to a significantly better catalytic performance compared to that of crystalline aluminosilicates.

DETAILED DESCRIPTION

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies.

In this invention, the amorphous Co—SiOx forms the structure of Co substitution for Si atoms in silicon oxide. Additionally, the amorphization of Co in silicon oxide results in a partial change in Co coordination from tetrahedral to octahedral and an increase in the average Co oxidation state. Consequently, the amorphous Co—SiOx behaves as a more robust and efficient catalytic performance during PMS activation.

Claimed herein is an amorphous CO—SiOx catalyst for use in catalytic activation of PMS and a method for activating PMS using CO—SiOx catalyst.

Example 1

The triblock copolymer surfactant, Pluronic P123, was purchased from Sigma-Aldrich. Tetraethyl orthosilicate (TEOS, 98%), Cobalt(II) acetate tetrahydrate ($Co(C_2H_3O_2)_2 \cdot 4H_2O$, 98%), 2,4-Dichlorophenol (99%) and hydrochloric acid (HCl, 37%) were purchased from Acros Organics. Potassium peroxymonosulfate ($2KHSO_5 \cdot KHSO_4 \cdot K_2SO_4$, Oxone, and monopersulfate, PMS) were purchased from Alfa Aesar.

6.0 g of P123 was dissolved in 255 ml of deionized water under vigorous stirring to obtain a homogenous solution. Then, 2.28 g of $Co(C_2H_3O_2)_2 \cdot 4H_2O$ serving as the cobalt(II) source was added into the homogenous solution at 35° C. under continuous stirring. Next, 13.8 ml of TEOS was distilled into the solution at 35° C. under continuous stirring for 24 h. The mixture was then transferred into a 500 ml of Teflon-lined autoclave and placed in box furnace (Lindberg/Blue M Moldatherm Box Furnace Thermo Scientific) at 100° C. for another 24 h without agitation. After 24 h, the product was naturally cooled down to room temperature. The product was then washed by at least 6 L of 90-100° C. deionized water. The filter product was placed in an oven and dried at 50° C. overnight. Finally, the product was calcined with air in the box furnace at 550° C. for 6 h. The final product was denoted as Co—SiOx. The original $SiO_2$ and a reference sample of $Co_3O_4$ were fabricated followed the same procedures as reported in the literature.

The amorphous catalyst Co—SiOx was characterized by transmission electron microscopy (TEM, JEOL JEM-2011). The surface chemical composition was analyzed using X-ray photoelectron spectroscopy (XPS, Scienta Omicron ESCA 2SR). The morphology and map scanning EDX images of the Co—SiOx were obtained using a scanning electron microscopy (SEM, Quanta 3D FEG FIB/SEM) coupled with energy-dispersive X-ray spectroscopy (EDX). The pore size distribution and BET surface area were determined by Micromeritics ASAP 2020 surface area and porosimetry analyzers. X-ray diffraction (XRD) (PANalytical Empyrean) was used to analyze the structure of the samples.

X-ray absorption near edge structure (XANES) spectroscopic measurements were performed at Louisiana State University's Advanced Microstructures and Devices (CAMD) Center, USA. The XANES measurements of Si K-edge were conducted at the "windowless" Double Crystal Monochromator beamline with a resolution of ~1 eV at these energies. Co K-edge XANES spectroscopic measurements were performed at CAMD's WDCM 2.0 beamline via a Si-111 channel-cut monochromator. The beamline was calibrated with a standard cobalt foil which was later kept in between the second and third chambers during measurement. Co L-edge and O K-edge XANES spectroscopic measurements were taken at the variable-line-space plane-grating-monochromator (VLSPGM) beamline.

Electrochemical impedance spectroscopy (EIS) and Mott-Schottky plots were conducted using a Biologic VSP-300 potentiostat. Stainless steel and Ag/AgCl were utilized as a counter electrode and a reference electrode, respectively. The electrodes were immersed in a 0.1 M $NaClO_4$ solution. The EIS plots were obtained over the frequency range of 200 kHz to 0.1 Hz. Mott-Schottky analysis was performed using a potential range from −1.0 V to 0 V at a frequency of 200 kHz.

The 2,4-DCP, a commonly regulated contaminant, was used as the model organic pollutant to evaluate the catalytic performance of the Co—SiOx system. Batch degradation experiments were performed under stirred conditions for the reaction system containing 150 ml of DCP with a known concentration, a fixed concentration of PMS, phosphate buffer solution (1 mM, pH 7), and the targeted amount of Co—SiOx within a 250 ml three-neck, round-bottom flask at room temperature (20±2° C.). The pH of the solution varied by 0.2 units during the entire reaction process. The reaction was initiated by sequentially adding the required amounts of PMS and Co—SiOx. 0.5 ml samples were withdrawn from the reactor at set time intervals and 0.5 ml methanol immediately added into the collected samples to terminate the oxidation reactions followed by filtering the samples using a 0.22 μm PTFE syringe filter to separate the Co—SiOx from the samples. All experiments were performed in duplicate and the average values with standard deviations were plotted (presented in the Results Section).

The concentration of 2,4-DCP was determined by a gas chromatography (GC) system (Agilent 5975C VLMSD) equipped with a Triple-Axis detector. The removal of total organic carbon (TOC) was determined using a TOC analyzer (SHIMADZU TOC-L). An electron paramagnetic resonance (EPR) (A300-10/12) system was used to identify free radicals of $SO_4 \cdot^-$ and $OH \cdot$ in the Co—SiOx/PMS reaction system along with the oxygen vacancies within the catalysts. 5,5-dimethyl-1-pyrroline N-oxide (DMPO) was used as a spin-trapping agent for the $SO_4 \cdot^-$.

The $N_2$ adsorption-desorption isotherms and pore size distribution of the original $SiO_2$ and Co—SiOx are shown in FIG. 1(A). The original $SiO_2$ and Co—SiOx specimens clearly show type IV isotherms suggesting the typical uniform mesoporous nature of the mesoporous material. Additionally, the $SiO_2$ exhibited H1 hysteresis loops with a capillary condensation step at $P/P_0$ of 0.64-0.76 suggesting a narrow range of uniform opened mesopores with minimal network effects. Conversely, the Co—SiOx specimen showed H2 hysteresis loops with a capillary condensation step at $P/P_0$ of 0.78-0.97 indicating the intrinsic features of the large pore size distribution and the pore-blocking. The narrow pore size distribution with a mean $d_p$ of 6.45 nm and the large pore size distribution with a mean $d_p$ of 26.78 nm for the $SiO_2$ and Co—SiOx, respectively, (inset of FIG. 1(A)) are agreement with the above observations. The results of the BET surface area and pore volume for the $SiO_2$ and Co—SiOx analyses are shown in Table 1. The textural properties of the Co—SiOx show a significant decrease in BET surface area ($A_{BET}$) from 1319.36 to 607.95 m$^2$/g and an increase in pore volume ($V_p$) from 1.56 to 2.70 cm$^3$/g associated with the increase of $d_p$ of mesopores compared to those of the original $SiO_2$. These significant changes in the textural properties of Co—SiOx are probably due to the changes occurring via substitution of Si atoms by Co atoms in the intrinsic structural framework of the mesoporous Co—SiOx.

TABLE 1

Textural properties of the $SiO_2$ and Co—SiOx.

| Samples | $d_{100}$ (nm) | $a_0$ (nm) | $A_{BET}$ (m$^2$/g) | $d_p$ (nm) | $V_p$ (cm$^3$/g) |
|---|---|---|---|---|---|
| $SiO_2$ | 10.14 | 11.71 | 1319.36 | 6.45 | 1.56 |
| Co—SiOx | 10.38 | 11.99 | 607.95 | 26.78 | 2.70 |

$a_0$: unit cell parameter calculated by $a_0 = 2d_{100}/\sqrt{3}$, $d_{100} = 1.54/2\sin(\theta_{100})$.

Figure 1B:
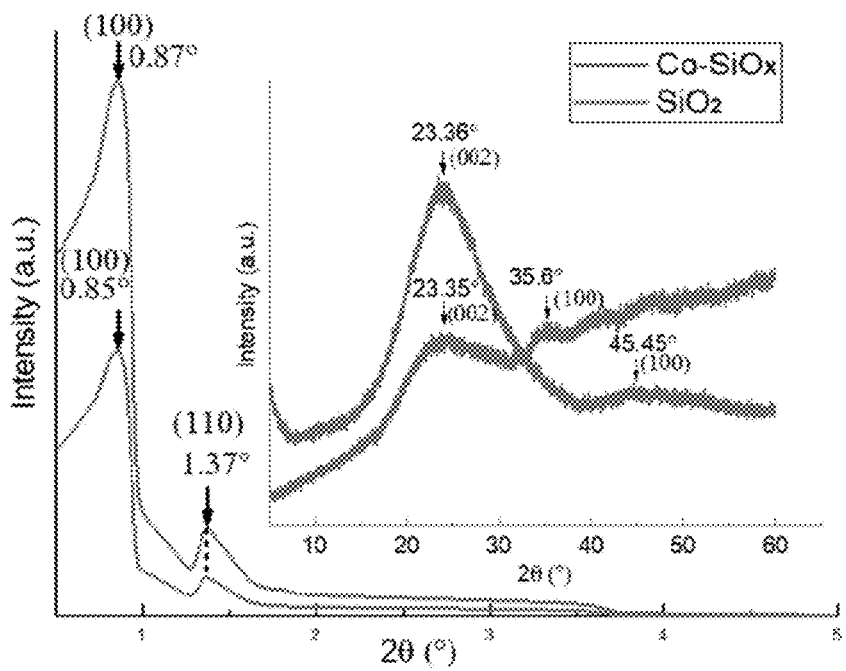
Figure 2A:
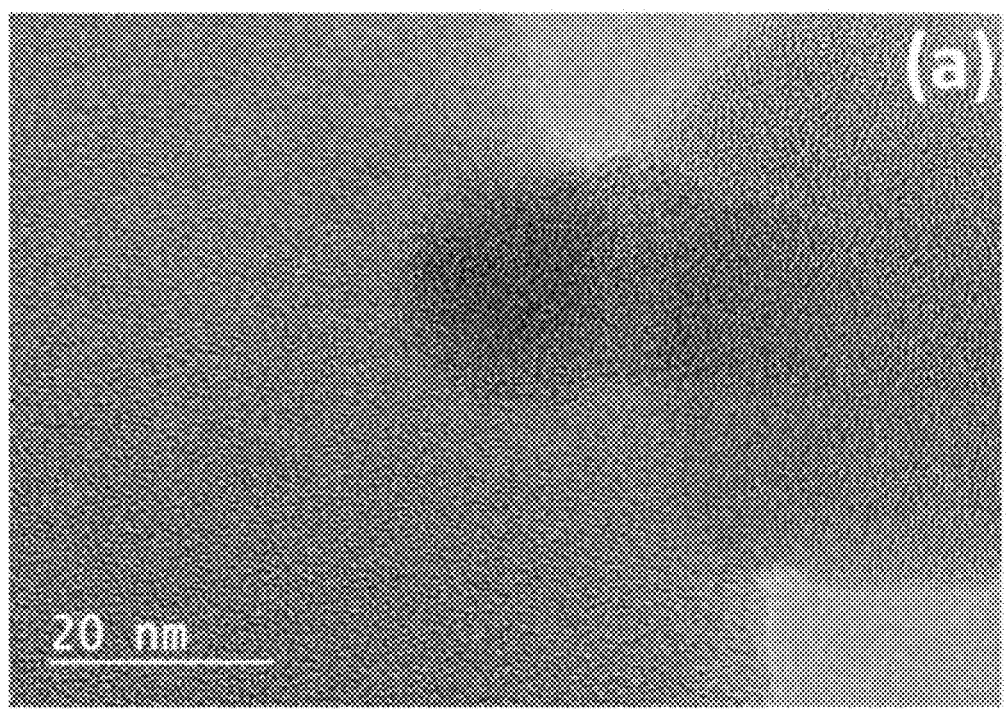
FIG. 2(A) shows HRTEM images of the Co—SiOx.
Figure 2B:
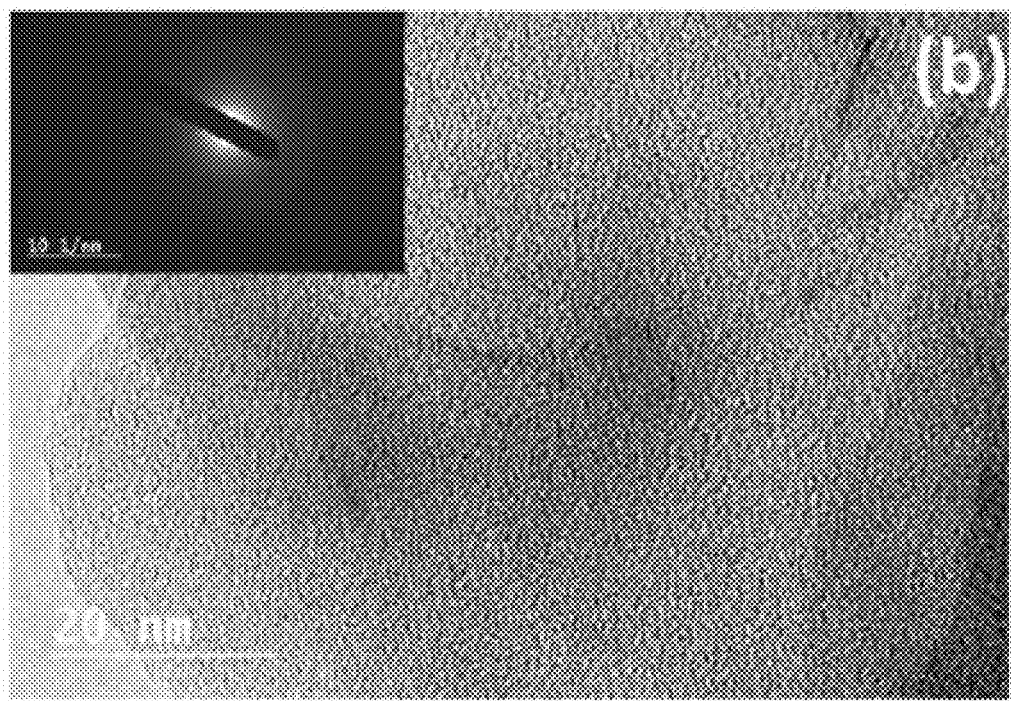
FIG. 2(B) shows SAED pattern of the Co—SiOx.
Figure 2C:
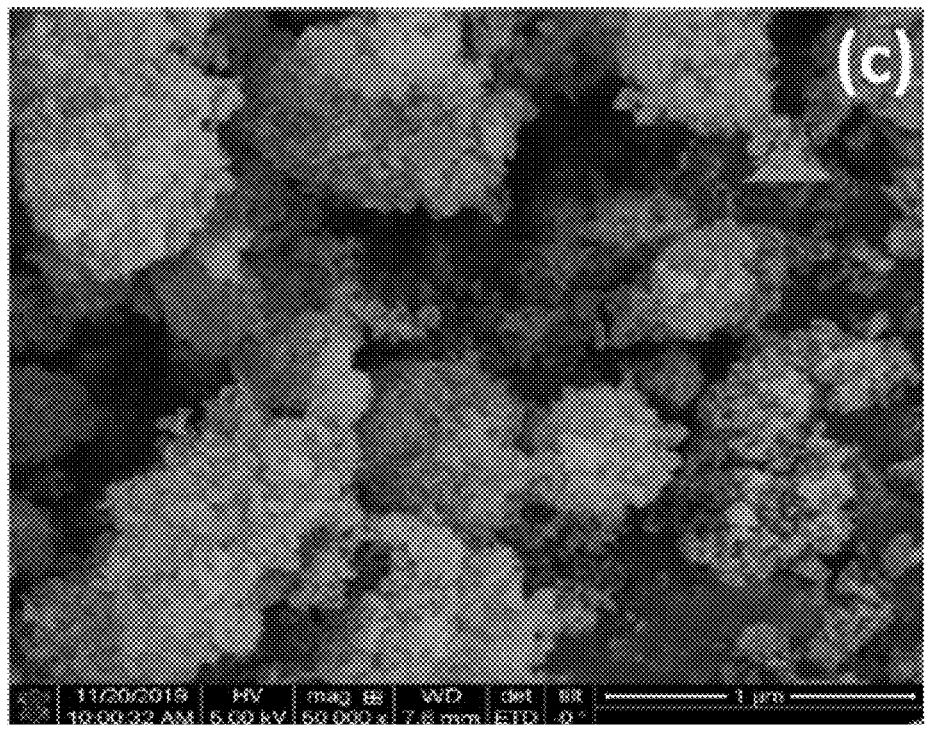
FIG. 2(C) shows SEM images of the Co—SiOx.
Figure 2D:
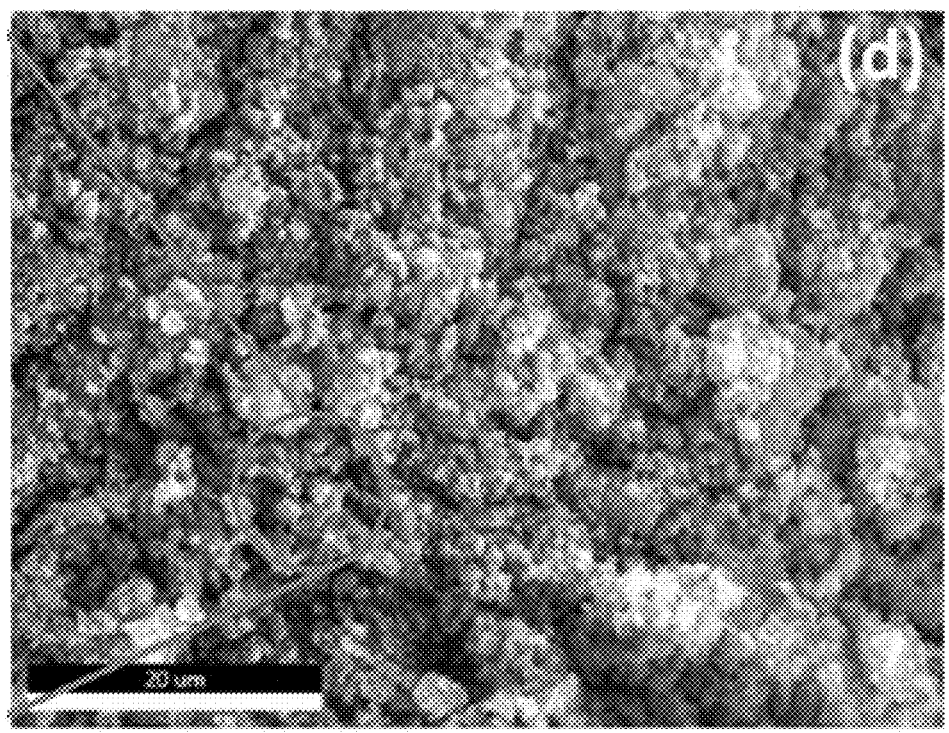
FIG. 2(D) shows another view of SEM images of the Co—SiOx
Figure 2E:
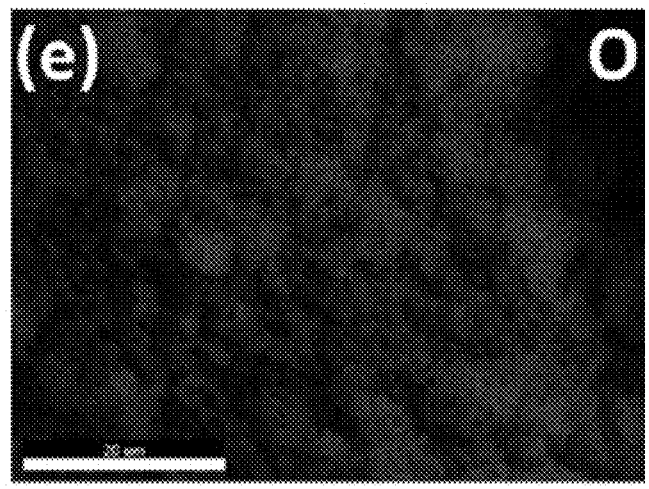
FIG. 2(E) shows Elemental mapping of O of Co—SiOx.
Figure 2F:
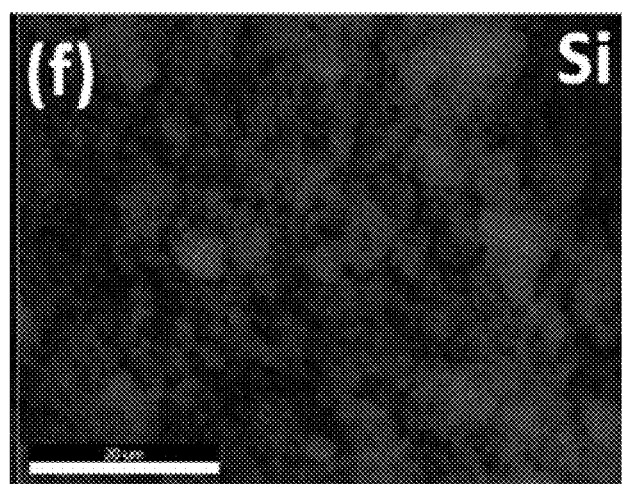
FIG. 2(F) shows Elemental mapping of Si of Co—SiOx.
Figure 2G:
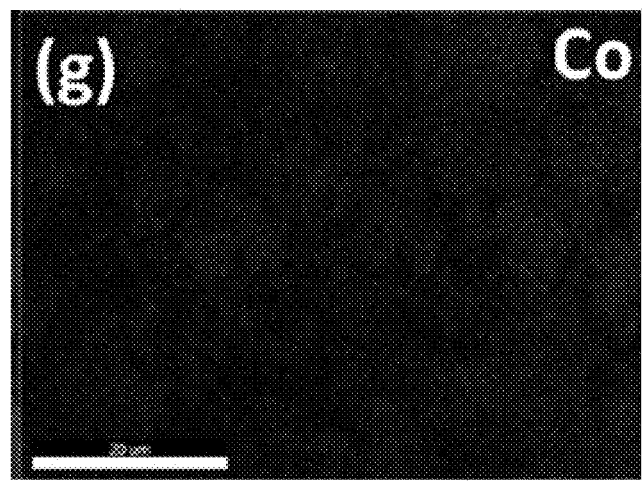
FIG. 2(G) shows Elemental mapping of Co—SiOx.

The small-angle and wide-angle XRD patterns for the $SiO_2$ and Co—SiOx are shown in FIG. 1(B). The small-angle XRD patterns show two characteristic diffraction peaks in the range of 0.85° to 1.37° corresponding to the (100) and (110) crystal planes of the mesoporous unit cell for both the $SiO_2$ and Co—SiOx, which is attributed to the resulting structure of the mesopores. Whereas, the peak location of the (100) plane migrates to a smaller angle from 0.87° to 0.85° with the incorporation of Co atoms. Accordingly, the calculated d-space of the (100) plane of the mesoporous unit cell, indicating the mesopores wall thickness, increased from 10.14 nm to 10.38 nm (Table 1). Similarly, the calculated unit cell parameter ($a_0$) increased from 11.71 nm to 11.99 nm (Table 1) attributed to the successful Co atom substitution in the structural framework of the Co—SiOx. The substituted Co atoms enlarges the unit cell parameter of the original $SiO_2$ resulting in the shift to a smaller angle for the peak location of the (100) plane. This is probably due to the substituted Co which as a larger atomic radius (r=135 pm) compared to the Si atom (r=110 pm). The wide-angle XRD patterns (inset of FIG. 1(B)) show an intense diffraction peak at 2θ=23.35° ascribed to (002) plane and a weak diffraction peak in the 2θ range of 35.6°-45.45° associated with the (100) plane, revealing the obvious graphitic structure for both of the $SiO_2$ and Co—SiOx specimens.

The diffraction peaks in the wide-angle XRD pattern of the $SiO_2$ is the characteristic sign of a typical amorphous $SiO_2$. Additionally, the characteristics of the wide-angle XRD pattern of the Co—SiOx are close to those found with the amorphous $SiO_2$ and without any pronounced diffraction peaks of the cobalt oxide crystalline nanoparticles being observed. This indicates that the Co—SiOx probably retains its amorphous nature. To confirm this hypothesis and obtain insights into the specimen microstructure, SEM, and HRTEM analyses were conducted and these results are shown in FIG. 2. The similar HRTEM images of the $SiO_2$ (FIG. 2(A)) and Co—SiOx (FIG. 2(B)) exhibit a uniform mesoporous structure with high porosity and no observed nanoparticles. A similar observation was reported by others in the literature. Also, the SAED pattern of the Co—SiOx (inset of FIG. 2(B)) convincingly confirms the amorphous nature of the Co—SiOx. The TEM images (FIG. 2(c-d)) show the sphere-like morphology of the Co—SiOx with a particle size below 1 μm. Based on the EDX results (Table 2), the atomic percentage/weight percentage of O, Si, and Co elements in the Co—SiOx were calculated to be 69.59%/54.68%, 28.19%/38.89%, and 2.22%/6.42%, respectively. Additionally, the EDX mapping images shown in FIG. 2(e-g) reveal that the O, Si, and Co are uniformly distributed on the surface of the Co—SiOx indicating the relatively pure nature of the Co—SiOx.

TABLE 2

EDX results of Co—SiO$_2$.

| Elements | Weight % | Atomic % |
|---|---|---|
| O | 54.68 | 69.59 |
| Si | 38.89 | 28.19 |
| Co | 6.42 | 2.22 |

Figure 3A:
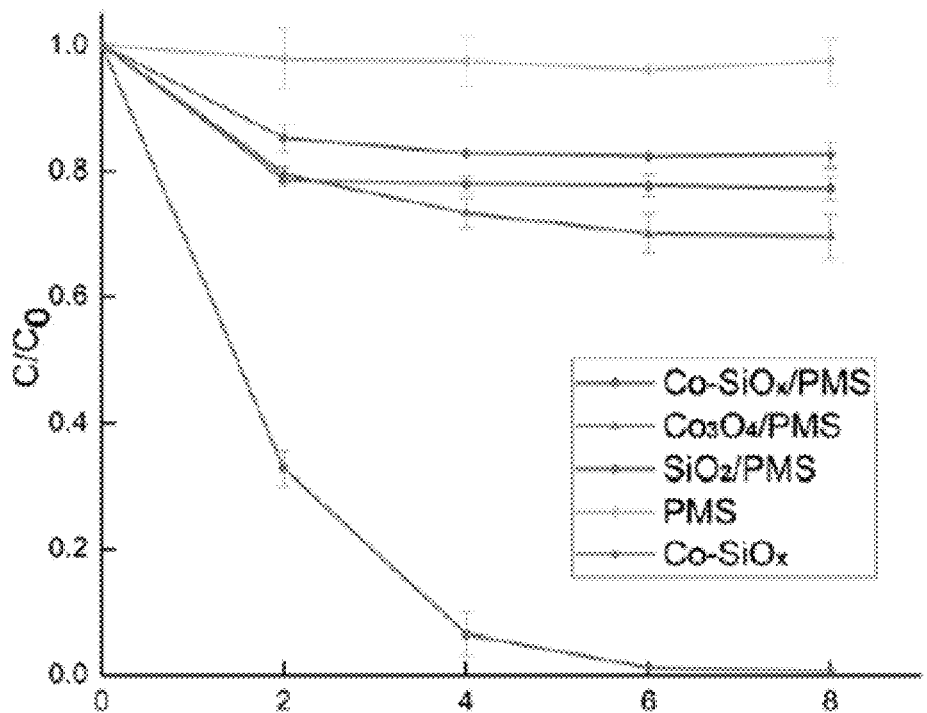
FIG. 3(A) shows degradation of 2,4-DCP in different reaction systems under certain conditions.

The 2,4-DCP was used as a representative organic pollutant to evaluate the degradation performance of the produced catalysts. The degradation of 2,4-DCP for the various reaction systems evaluated are shown in FIG. 3(A). $Co_3O_4$, $SiO_2$, and Co—SiOx were used as the heterogeneous catalysts to evaluate the catalytic activity resulting in the degradation of 2,4-DCP. The results show that PMS alone did not exhibit any degradation performance for 2,4-DCP. The removal of 2,4-DCP by the Co—SiOx in the absence of PMS is also minimal indicating the adsorption of 2,4-DCP onto the Co—SiOx is insignificant.

In contrast, almost 100% degradation of 2,4-DCP within 6 mins in the Co—SiOx/PMS reaction system was observed, indicating that the Co—SiOx exhibits excellent catalytic degradation properties toward 2,4-DCP by activating the PMS. Additionally, only 25% and 21% degradation of 2,4-DCP occurred within 8 mins in the $Co_3O_4$/PMS and $SiO_2$/PMS reaction systems, respectively, proving that the amorphous Co—SiOx is more responsible for DCP removal than are the $Co_3O_4$ and $SiO_2$ for the activation of PMS.

Figure 3B:
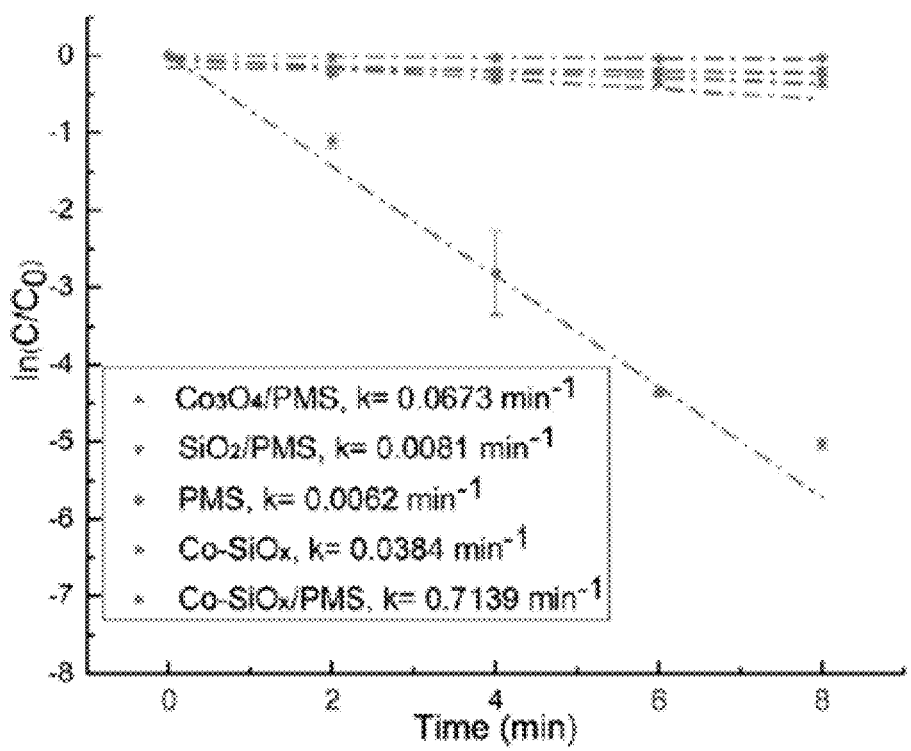
FIG. 3(B) shows degradation kinetics of 2,4-DCP under certain conditions.

In FIG. 3(B), the corresponding kinetic rate constants (k) were calculated. The k value in the Co—SiOx/PMS reaction system was calculated to be 0.7139 min$^{-1}$, which is much higher than the 0.0673 min$^{-1}$ and 0.0081 min$^{-1}$ rates calculated for the $Co_3O_4$/PMS and $SiO_2$/PMS reaction systems, respectively.

Figure 3C:
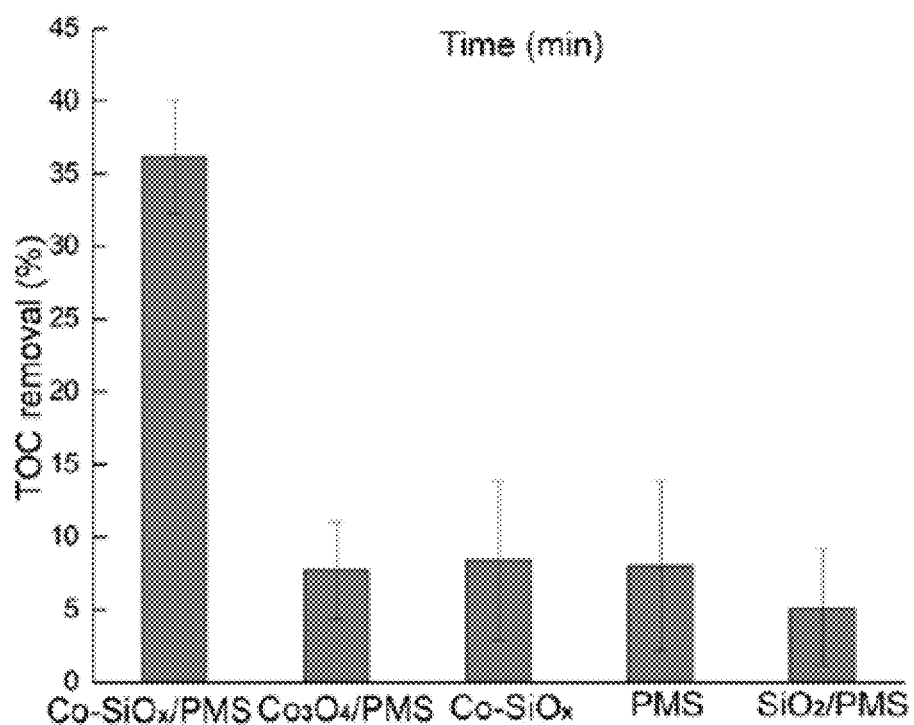
FIG. 3(C) shows TOC removal efficiency under certain conditions.

The removal of TOC in these different reaction systems was also evaluated and is shown in FIG. 3(C). Over 35% removal of TOC is observed within 20 mins in the Co—SiOx/PMS reaction system, while the other reaction systems yielded much lower TOC removal efficiency. All these results confirm that the amorphous Co—SiOx exhibits superior catalytic activity to the PMS activation, which enhances the degradation of 2,4-DCP compared to the $Co_3O_4$ and $SiO_2$.

The comparison of the various reported first-order rate constants from literature using different water-based oxidation systems 2,4-DCP degradation is listed in Table 3. These reported rate constants provide a basis for the direct comparison of the first-order rate constant from our experiments. The degradation of 2,4-DCP has been investigated and reported via various approaches, such as ultrasound, ozone, photocatalytic oxidation, hydroxyl radical-based AOPs, sulfate radical-based AOPs, Fenton's Reagent oxidation, and electro-Fenton's Reagent oxidation.

As shown in Table 3, the amorphous Co—SiOx as an oxidation process for 2,4-DCP degradation via primarily the sulfate radical yielded a significantly higher first-order kinetic rate (0.7139 min$^{-1}$) than those produced from the other studies listed. These results show that the amorphous Co—SiOx is a kinetically superior oxidation system that the more traditional processes listed in Table 3. It also provides a framework to highlight the great potential that Co—SiOx has an oxidation process for waterborne organic pollutants. Plus, being a "dark" AOP, Co—SiOx is not dependent on water UV-transmissivity making its use toward turbid water influent viable. This provides another significant advantage over the "lighted" oxidation systems.

TABLE 3

Comparison of 2,4-DCP Degradation Kinetic Rates Using Different Oxidation Systems.

| Catalysts | Kinetic rate, ×10$^{-2}$ min$^{-1}$ | Approaches | Experimental conditions |
|---|---|---|---|
| Amorphous Co—SiOx (This study) | 71.39 | Sulfate radical-based AOPs | pH 7.02, 298K |
| $FeCo_2O_{4-x}$ spinel[33] | 13.10 | Sulfate radical-based AOPs | pH 6.8, 298K |
| β-CD-$MnFe_2O_4$[34] | 5.94 | Sulfate radical-based AOPs | pH 5.98, 298K |
| CoOOH nanoparticles[35] | 4.62 | Sulfate radical-based AOPs | pH 7.0, 296K |
| $Co_3Fe_7$—$CoFe_2O_4$[36] | 1.80 | Sulfate radical-based AOPs | pH 7.7, 303K |
| $Fe_3O_4$@GO@MIL-100(Fe)[37] | 19.69 | Visible light/Photocatalyst/$H_2O_2$ | pH 5.5, Vis 500 W |
| MgAlTi mixed oxides[38] | 17.88 | Visible light/Photocatalyst | 1 g/L, 298K |
| N-carbon@N—ZnO-650[39] | 2.50 | Visible light/Photocatalyst | Vis 300 W, 298K |
| BFO—CN—WO[40] | 1.31 | Visible light/Photocatalyst | 2.5 g/L, Vis 300 W |
| Modified Iron-carbon[41] | 5.54 | Electro-Fenton | pH 6.7, 100 mA |
| $Ce_xV_{1-x}O_2$[42] | 3.16 | $H_2O_2$ | 0.06M $H_2O_2$, 343K |
| Iron-based nanoparticles[43] | 2.65 | $H_2O_2$ | pH 6.8, 303K |
| Cu(II)-montmorillonite[44] | 0.49 | $H_2O_2$ | pH 6.0, 353K |
| — | 0.26 | UV/$H_2O_2$[45] | pH 7.5, 298K |
| — | 46.00 | Ozone/Acetic acid[46] | 50 ml/min, 293K |
| — | 1.29 | Ozone[47] | 400 mg/h, 298K |
| Pal-Fe/Ni[48] | 1.12 | Heterogeneous | pH 3.0, 298K |
| — | 0.31 | Ultrasound[47] | pH 5.0, 307K |

Example 2

To demonstrate the chemical structure of the materials, the chemical states of O, Si, and Co in the $SiO_2$, Co—SiOx, and spent Co—SiOx were analyzed by XPS spectra. As shown in FIG. 4(a-c), the O 1s spectra of the $SiO_2$, Co—SiOx, and spent Co—SiOx were deconvoluted and exhibited three common characteristic peaks located at 532.94-533.15 eV, 532.55 eV, and 531.28-531.92 eV, corresponding to structural oxygen species (Si—O—Si or $O^{2-}$), hydroxyl groups (OH$^-$) and adsorbed water molecules, and ($O_2^{2-}$ and O$^-$), respectively. The peaks at 531.28-531.92 eV are ascribed to adsorbed oxygen species that represent oxygen vacancies ($O_v$), which are associated with $O^{2-}$ ions in oxygen-deficient regions within the $SiO_2$ matrix. Meanwhile, it can be observed that the relative proportion of the peak associated with the $O_v$ increases from 11.86% in the $SiO_2$ to 16.35% in the Co—SiOx, which indicates the substitution of Si by Co thus creating more $O_v$ since single Co atom bonding will have a lower oxidation state compared to a Si atom bonding which has fewer oxygen atoms. FIG. 4(d-e) show the overall spectra of O 1s and Si 2P for the $SiO_2$, Co—SiOx, and spent Co—SiOx. More details of these spectra will be discussed below.

Figure 4A:
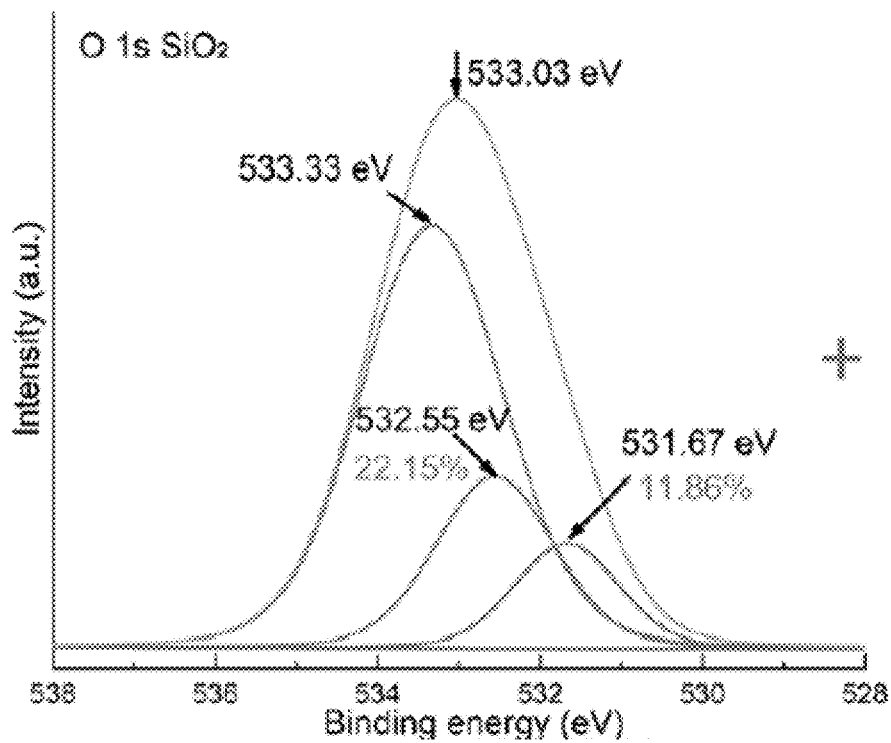
FIG. 4(A) shows XPS spectra of O 1s of $SiO_2$.
Figure 4B:
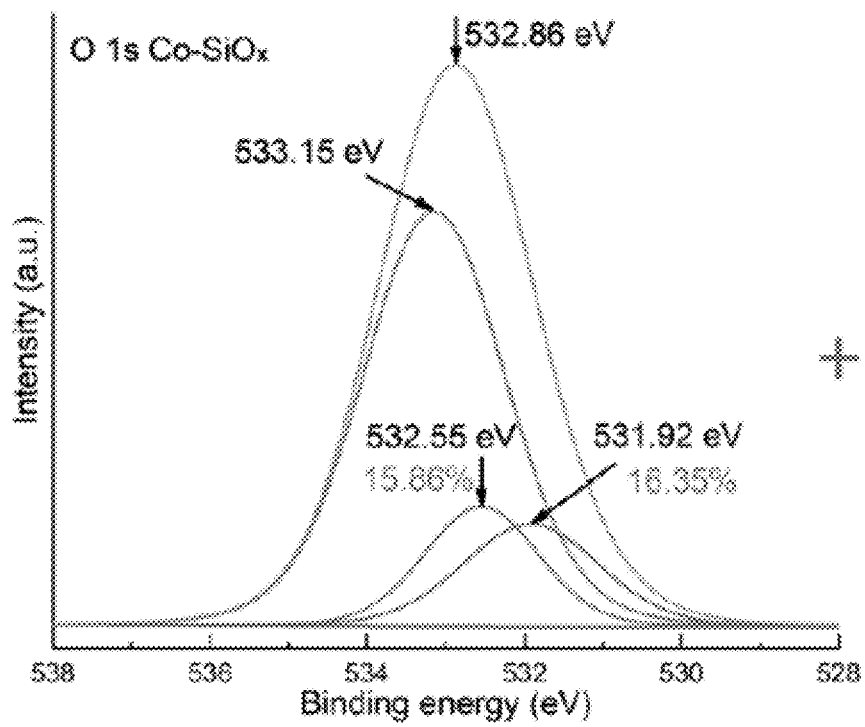
FIG. 4(B) shows XPS spectra of O 1s of Co—SiOx.
Figure 4C:
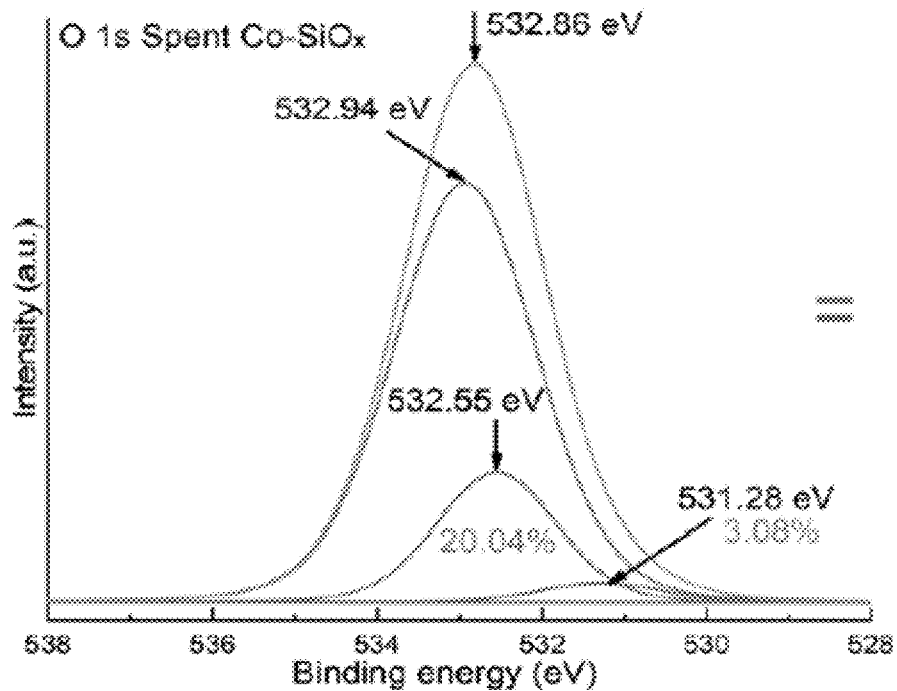
FIG. 4(C) shows XPS spectra of O 1s of Spent Co—SiOx.
Figure 4D:
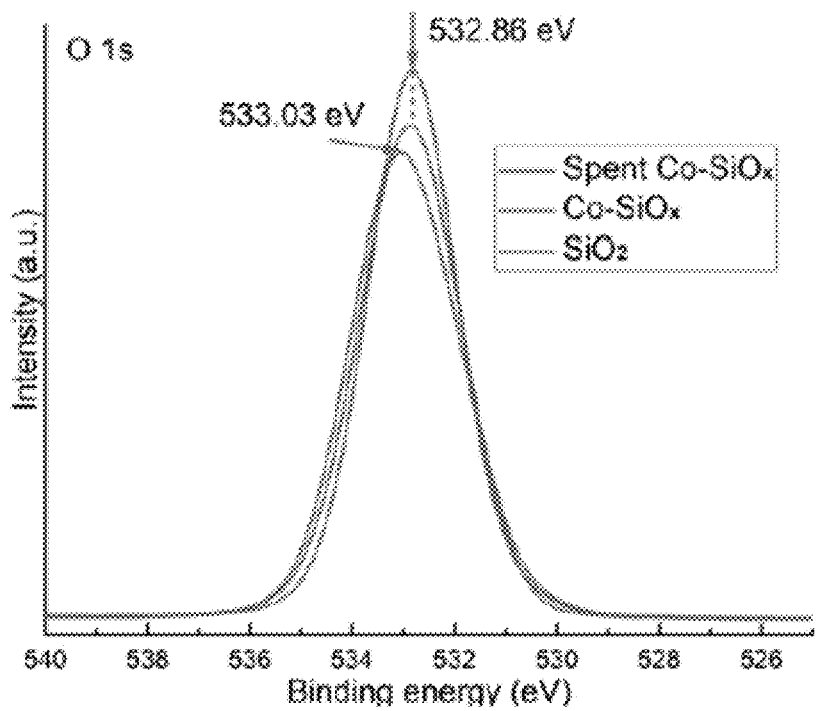
FIG. 4(D) shows the comparison spectra of O 1s.
Figure 4E:
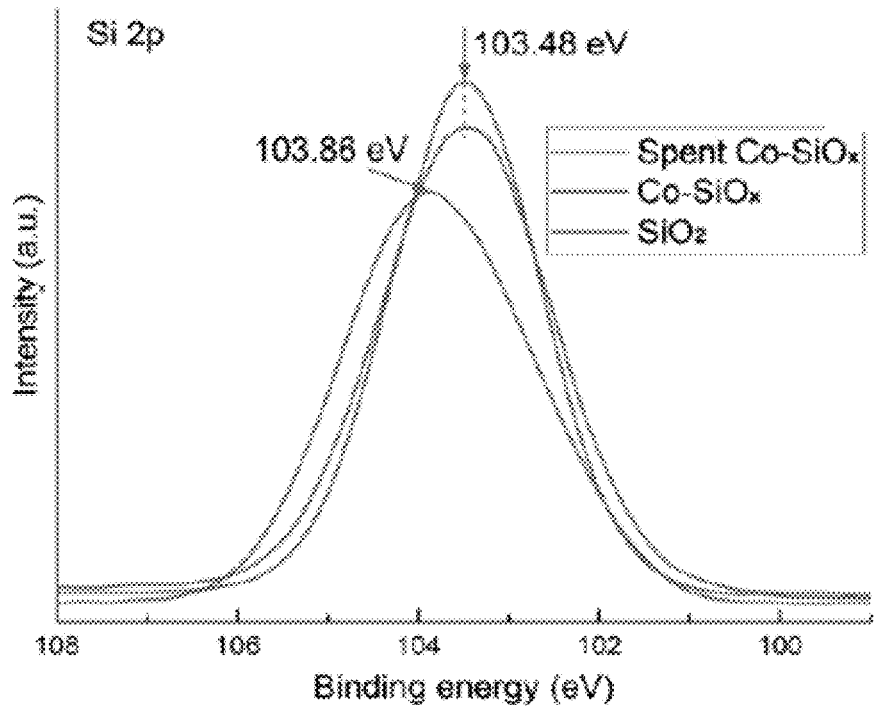
FIG. 4(E) shows the comparison spectra of Si 2p.
Figure 4F:
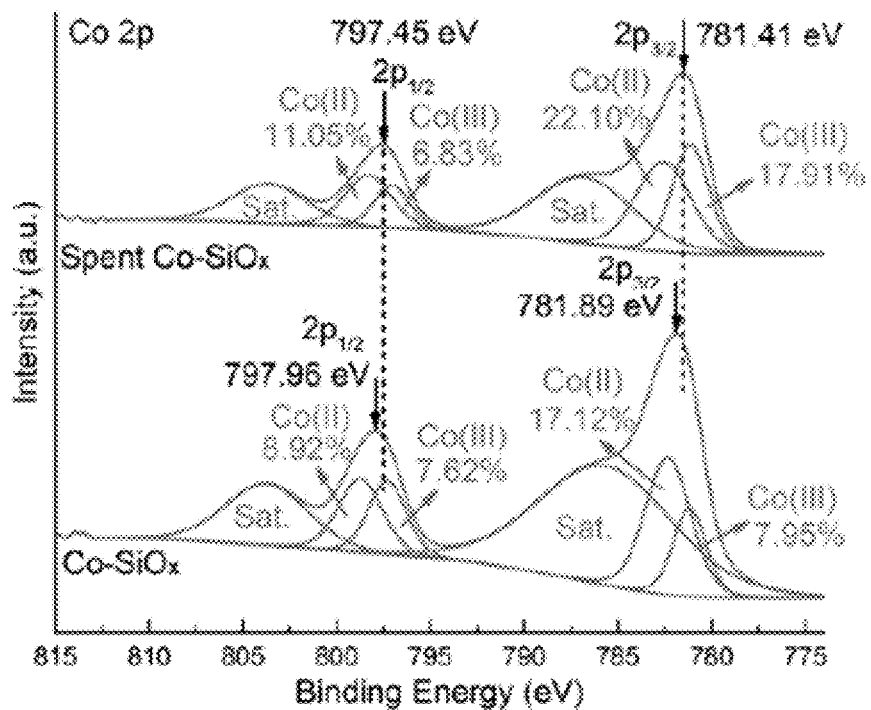
FIG. 4(F) shows the comparison spectra of Co 2p.

Besides, the relative proportion of the peak associated with $O_v$ in the spent Co—SiOx shows a reduction of 13.27% compared to that in the Co—SiOx, which could be caused by the neutralization of $O_v$ during the catalytic processes. This phenomenon can also be observed in the XPS spectra of the Co 2p. As shown in FIG. 4(F), both the Co 2p spectrums for the Co—SiOx and spent Co—SiOx show the same characteristic peaks at 781.41-781.89 eV and 797.45-797.96 eV, corresponding to Co $2p_{3/2}$ and Co $2p_{1/2}$, respectively. The peaks of Co $2p_{3/2}$ were split into two peaks at 782.32-782.55 eV and 781.12-781.17 eV for Co(II) and Co(III), respectively. Similarly, the corresponding peaks of Co(II) and Co(III) split from the Co $2p_{1/2}$ peak at 798.29-797.71 and 797.03-797.27 eV, respectively.[54] The peaks at 785.62-786.77 and 803.64-803.73 eV are assigned to the satellites.[54] The relative proportion of Co(II) to Co(III) are shown in Table 4. From these results, the total proportion of Co(II) and Co(III) in the Co—SiOx and spent Co—SiOx are 26.04%/15.57% and 33.15%/24.74%, respectively.

Thus, the ratio of Co(II)/Co(III) decreases from 1.67 in the Co—SiOx to 1.34 in the spent Co—SiOx suggesting that the relative proportion of Co(III) increases and the relative proportion of Co(II) decreases after the use of the Co—SiOx. This change indicates that the catalytic activities promoted the conversion of oxidation state of Co from Co(II) to Co(III). The presence of Co(II) associates with the abundance of nascent $O_v$ in the Co—SiOx promoted the transfer of electrons from the Co(II) to the surface and then the diffusion of oxygen-ions from the surface into the bulk $O_v$.

Figure 5A:
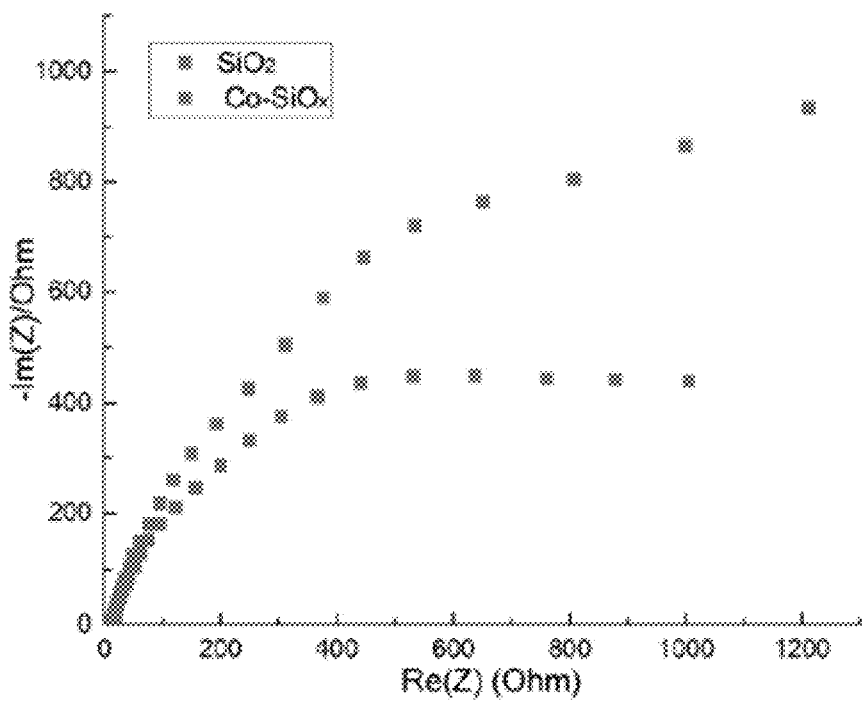
FIG. 5(A) is Nyquist plots of $SiO_2$ and Co—SiOx. Nyquist plots were obtained at −1.0 V and in the frequency range of 200 kHz to 0.1 Hz.
Figure 5B:
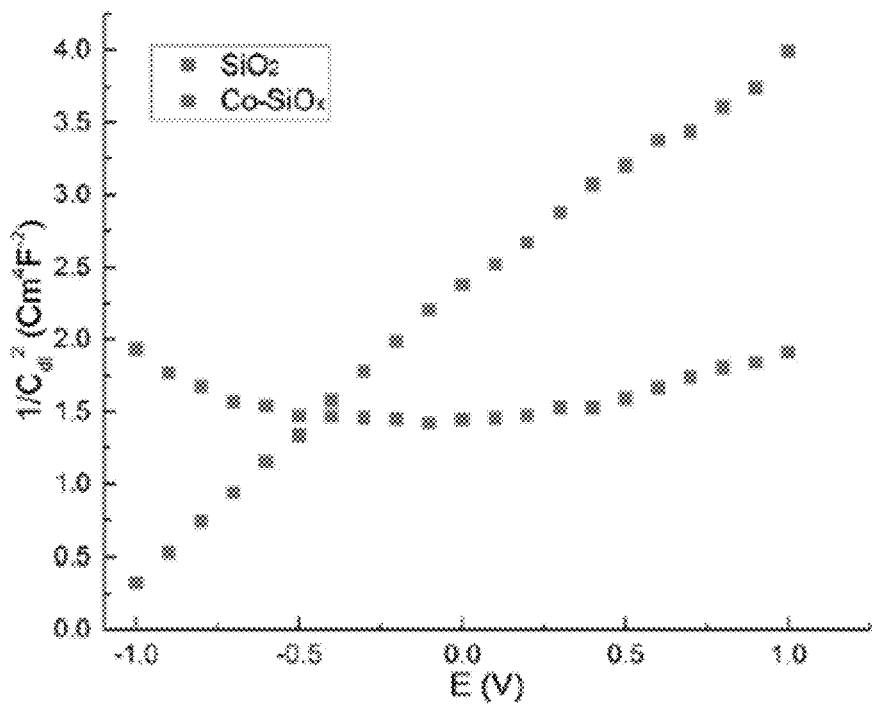
FIG. 5(B) is Mott-Schottky plots in electrochemical impedance spectroscopy. The Mott-Schottky plots were measured at a fixed frequency of 200 kHz in aqueous $NaClO_4$ solution (0.1 M).

High-spine $Co^{II}(t_{2g}^{3\uparrow 2\downarrow} e_g^{2\uparrow})$ has the extremely active electrons with parallel spins on unstable $de_g$-orbitals resulting in the release of these electrons from the $de_g$-orbitals. Meanwhile, the adjacent $O_v$ will be occupied by the diffusion of oxygen-ion leading to the formation of Co(III)-$O_O^{..}$ pairs in the Co—SiOx for PMS activation. Consequently, the Co—SiOx performs at a much higher PMS activation efficiency than does the $SiO_2$. The evaluation of electron-transfer efficiency for the Co—SiOx and $SiO_2$ was analyzed by EIS Nyquist and Mott-Schottky plots as shown in FIG. 5(A),(B). The results reveal that the lower $R_{ct}$ is observed with the Co—SiOx implying the significant improvement of electron-transfer efficiency and a higher electrochemical activity over the $SiO_2$. The reason for this is that the presence of Co(II) and $O_v$ sites increases the charge carrier density leading to the enhancement of electrical conductivity. Thus, the combination of the Co(II) and the $O_v$ in the Co—SiOx provides more effective reactive sites enhancing the catalytic activation of PMS. The catalytic activation of PMS on the Co—SiOx could be expressed by the following reactions.

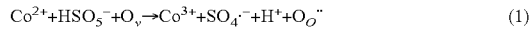
$$Co^{2+}+HSO_5^-+O_v \rightarrow Co^{3+}+SO_4^{\cdot-}+H^++O_O^{..} \quad (1)$$

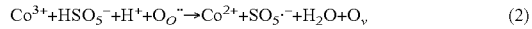
$$Co^{3+}+HSO_5^-+H^++O_O^{..} \rightarrow Co^{2+}+SO_5^{\cdot-}+H_2O+O_v \quad (2)$$

Where, $O_v$ and $O_O^{..}$ are the oxygen vacancies and $O^{2-}$ occupied oxygen sites in the Co—SiOx, respectively. Nevertheless, the contribution of Reaction 1 is much more significant than that of Reaction 2 in the PMS activation due to the obvious reduction of the relative proportion of $O_v$ and increase of the proportion of Co(III) in the spent Co—SiOx.

MeOH and t-BuOH (TBA) react with OH· radical via similar bimolecular rate constants of $9.7 \times 10^8$ $M^{-1}S^{-1}$ and $6.0 \times 10^8$ $M^{-1}S^{-1}$, respectively, but MeOH exhibits a higher rate constant of $3.2 \times 10^6$ $M^{-1}S^{-1}$ for $SO_4^{\cdot-}$ than does t-BuOH for $SO_4^{\cdot-}$ ($4.0 \times 10^5$ $M^{-1}S^{-1}$). To confirm that the active radicals derived from PMS activation by the Co—SiOx contribute to the significant degradation of 2,4-DCP in the Co—SiOx/PMS reaction system. MeOH and t-BuOH was used for $SO_4^{\cdot-}$ and OH· scavenging in the radical quenching experiments. The degradation kinetics of 2,4-DCP in the presence of MeOH as the scavenger for $SO_4^{\cdot-}$ was determined and shown in FIG. 6(A). The presence of excess MeOH in the Co—SiOx/PMS reaction system significantly quenched 2,4-DCP degradation resulting in a dramatic reduction of the k value from 0.7139 to 0.0741 $min^{-1}$. This result indicates that the $SO_4^{\cdot-}$ in the Co—SiOx/PMS reaction system exhibits the majority contribution to the degradation of 2,4-DCP and the reduction of TOC. However, the OH· generated in the Co—SiOx/PMS reaction system, as quenched by MeOH, potentially contributing to the 2,4-DCP degradation should not be ignored. Therefore, the kinetics of 2,4-DCP degradation in the presence of TBA as the scavenger for OH· was evaluated to confirm the quenching effect in the Co—SiOx/PMS reaction system.

Figure 6A:
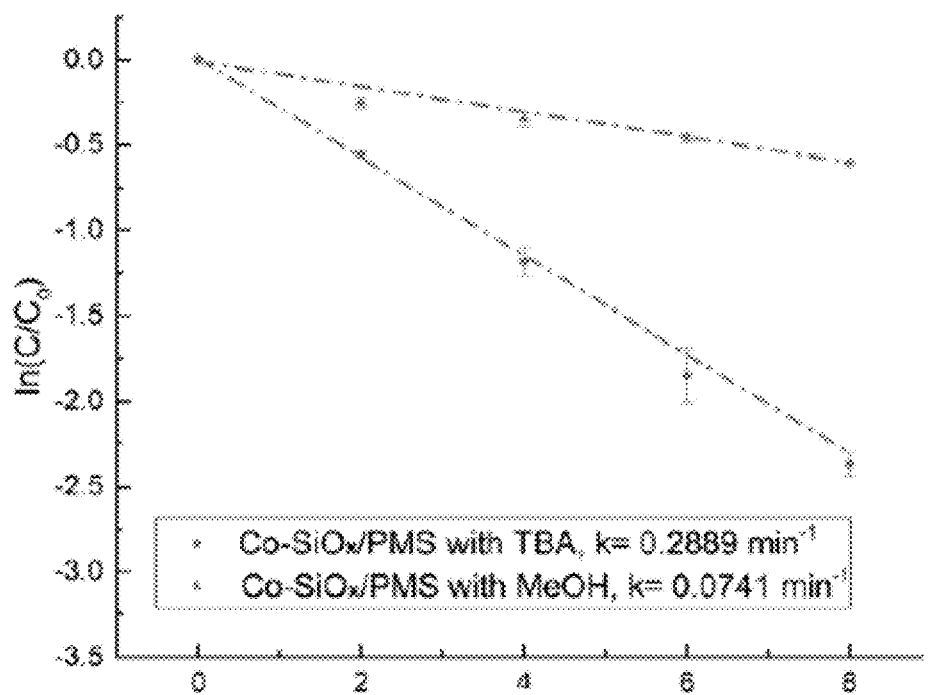
FIG. 6(A) shows quenching effects of t-BuOH and MeOH on catalytic activity of the Co—SiOx.

As shown in FIG. 6(A), the k value of 2,4-DCP degradation in the system quenched by TBA is 0.2889 $min^{-1}$, which is more effective than that in the system quenched by MeOH· This result confirms that $SO_4^{\cdot-}$ was the primary oxidation mechanism for the 2,4-DCP within the Co—SiOx/PMS system. Moreover, the contribution of OH· to the 2,4-DCP degradation is also essential because the kinetics of 2,4-DCP degradation was significantly quenched by TBA resulting in a reduction of k value from 0.7139 $min^{-1}$ to 0.2889 $min^{-1}$. In other words, both $SO_4^{\cdot-}$ and OH· show the considerable contributions to the 2,4-DCP degradation observed in the Co—SiOx/PMS system and that $SO_4^{\cdot-}$ is the principal oxidative mechanism due to its higher redox potential ($E^0$=2.5-3.1 V).[56] The abundance of the OH· radical also contributed to 2,4-DCP degradation and were probably generated by the $SO_4^{\cdot-}$ second reaction as shown in the following:

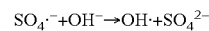
$$SO_4^{\cdot-}+OH^- \rightarrow OH\cdot+SO_4^{2-}$$

Thus, the overall reactions of PMS activation could be updated as the following equations:

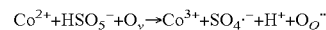
$$Co^{2+}+HSO_5^-+O_v \rightarrow Co^{3+}+SO_4^{\cdot-}+H^++O_O^{..}$$

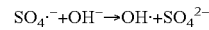
$$SO_4^{\cdot-}+OH^- \rightarrow OH\cdot+SO_4^{2-}$$

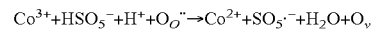
$$Co^{3+}+HSO_5^-+H^++O_O^{..} \rightarrow Co^{2+}+SO_5^{\cdot-}+H_2O+O_v$$

Consequently, the active $SO_4^{\cdot-}$ and OH· radicals generated from PMS activated by the Co—SiOx work in unison to effectively degrade 2,4-DCP. Thus, the 2,4-DCP degradation process is proposed using the following reaction:

TABLE 4

Relative proportion of Co(II) and Co(III) in the Co—SiOx and spent Co—SiOx.

| | Co(II) | | | Co(III) | | | |
|---|---|---|---|---|---|---|---|
| Samples | $2p_{1/2}$ | $2p_{3/2}$ | Total | $2p_{1/2}$ | $2p_{3/2}$ | Total | Co(II)/Co(III) |
| Co—SiOx | 8.92% | 17.12% | 26.04% | 7.62% | 7.95% | 15.57% | 1.67 |
| Spent Co— | 11.05% | 22.10% | 33.15% | 6.83% | 17.91% | 24.74% | 1.34 |

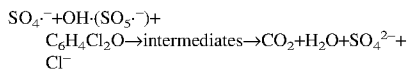

Figure 6B:
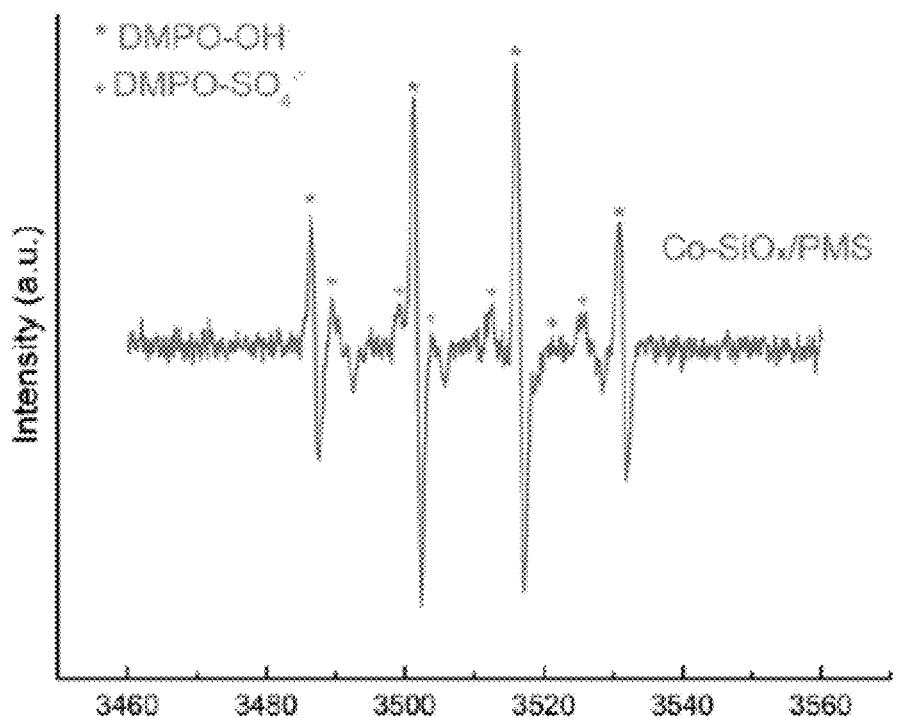
FIG. 6(B) shows EPR spectra of DMPO-OH· and DMPO-$SO_4 \cdot^-$.

$SO_4^{\cdot-}+OH\cdot(SO_5^{\cdot-})+$
$C_6H_4Cl_2O \rightarrow intermediates \rightarrow CO_2+H_2O+SO_4^{2-}+Cl^-$ To directly confirm the active species in the Co—SiOx/PMS system, EPR analysis was implemented using DMPO as a spin trap agent. As shown in FIG. 6(B), the characteristic peaks for DMPO-SO$_4 \cdot^-$ and DMPO-OH· adducts are identified in the EPR spectra, indicating the existence of active species of OH· and SO$_4 \cdot^-$ in the Co—SiOx/PMS system.

Figure 6C:
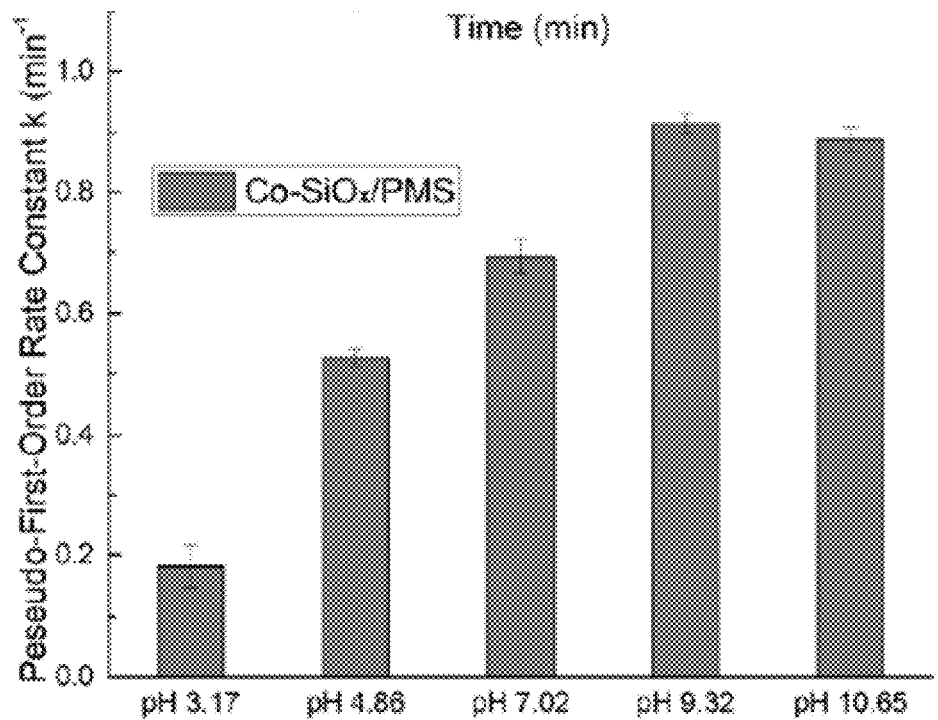
FIG. 6(C) shows pH effects on kinetic rate of 2,4-DCP degradation.

As shown in FIG. 6(C), the k value of the 2,4-DCP degradation at acidic conditions is significantly smaller than that at basic conditions, demonstrating that a higher pH condition can probably accelerate the catalytic degradation of 2,4-DCP in the Co—SiOx/PMS system. This result could be explained by postulating that the relative lower H$^+$ concentrations in solution at the higher pH range could promote the occurring of the mechanism reaction of PMS activation thus stimulating the higher increased production of SO$_4 \cdot^-$ resulting in the acceleration of 2,4-DCP degradation. On the other hand, the more OH$^-$ ions present in the based condition promoted the progress of the reaction between SO$_4 \cdot^-$ and OH$^-$ resulting in more generated OH· in the Co—SiOx/PMS reaction system. Therefore, the performance of 2,4-DCP degradation was significantly better at basic conditions.

Figure 6D:
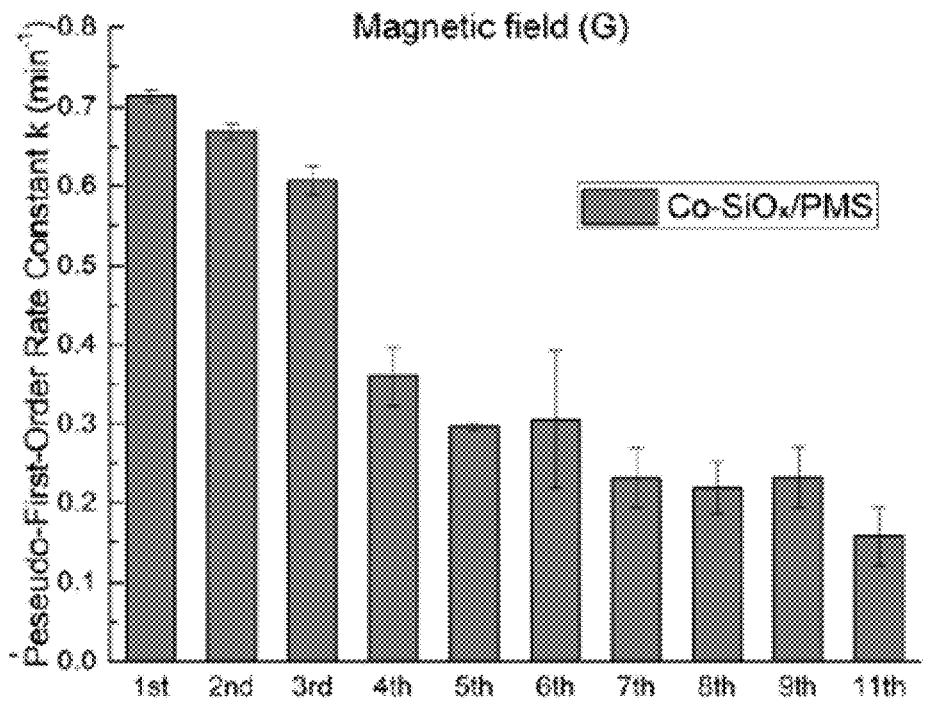
FIG. 6(D) shows the reusability of Co—$SiO_2$ for 2,4-DCP degradation. Conditions: [2,4-DCP]=122.6 μM, [PMS]=3 mM, [Co—SiOx]=1 g/L, and room temperature.

The 2,4-DCP degradation in the same Co—SiOx/PMS system was repeatedly conducted for 11 cycles under the same conditions using the same reagents. As shown in FIG. 6(D), the kinetic rates of 2,4-DCP degradation decrease gradually with continuous use. This result indicates that the catalytic activities of the Co—SiOx are weakened after repeated usage. The reason is probably that continuously running the same reagents could consistently reduce the amount of Co(II)-O$_v$ active pairs in the Co—SiOx, which is in agreement with XPS analysis, resulting in the decrease of the catalytic activities.

Figure 7:
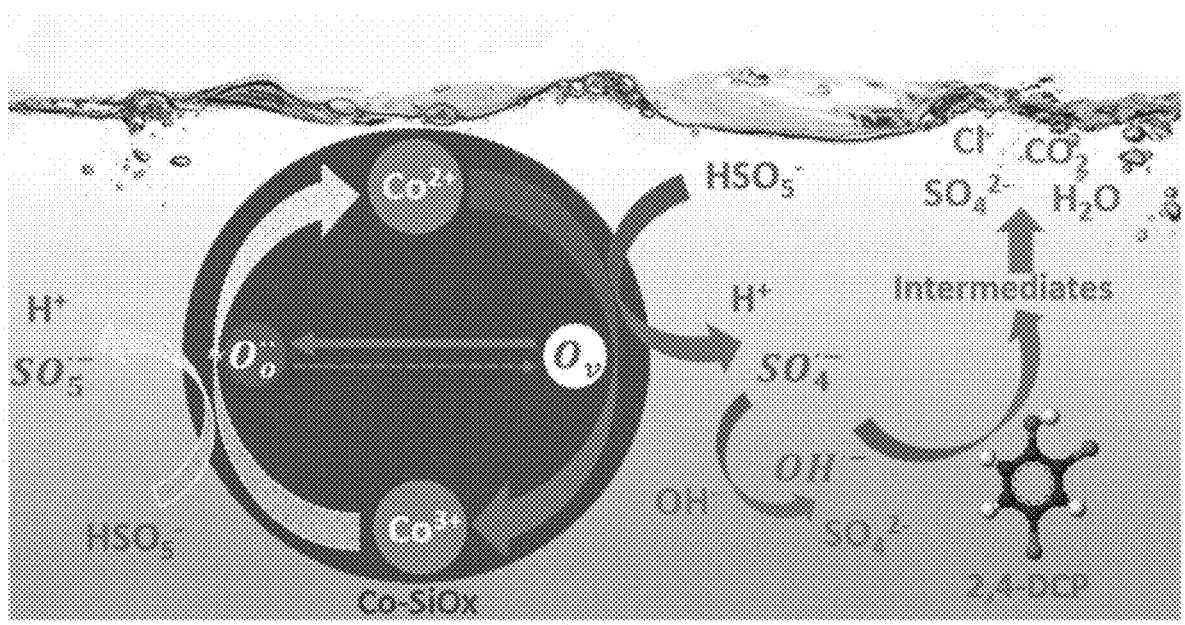
FIG. 7 is the proposed mechanisms of the PMS activation by the Co—SiOx and 2,4-DCP degradation.

Overall, the proposed mechanisms of the PMS activation by the Co—SiOx and the resulting 2,4-DCP degradation are shown in FIG. 7. The mechanism of PMS activation by the Co—SiOx is the conversion of Co(II) to Co(III) with occupying O$_v$ by the oxygen-ion diffusion. The Co(II)-O$_v$ pairs play a key role during PMS activation. Consequently, the effective degradation of 2,4-DCP occurs in conjunction with the generated SO$_4 \cdot^-$ and OH· in the system.

As shown in FIG. 4(d-f), the shifts of the binding energy occurred in the O 1s and Si 2P spectra for the SiO$_2$, Co—SiOx, and spent Co—SiOx. The O 1s and Si 2P spectra of the Co—SiOx and spent Co—SiOx exhibited significant shifts from 533.03 to 532.86 eV and 103.86 to 103.48 eV, respectively, compared to those of the SiO$_2$. No shifts occur in the binding energy of O 1s and Si 2P spectra for the Co—SiOx and spent Co—SiOx. Additionally, the binding energy of Co 2p$_{3/2}$ and Co 2p$_{1/2}$ of the spent Co—SiOx shifted from 781.89 to 781.41 eV and 797.96 to 797.45 eV, respectively, compared with those of the Co—SiOx. Generally, the shifts in the binding energy of the O 1s and Si 2P spectra for the Co—SiOx and the SiO$_2$ are attributed to the substitution of Si by Co atoms and the shifts in the binding energy of Co 2p for the Co—SiOx and spent Co—SiOx attributed to the catalytic activation of PMS. However, the mechanisms/causes of these shifts in the binding energy in XPS spectra are still unknown. Theoretically, the binding energies of a photoelectron can be significantly influenced by the ground- and/or final-state energies resulting in shifts in the binding energy in the XPS spectra. The ground- and final-state energies have been combinedly expressed in a charge potential model as shown in Equation 3.

$$\Delta E_i = E_i - E_i^0 = \left(k\Delta q_i + \Delta \sum_{k \neq j} \frac{q_j}{r_{ij}}\right) - \left(\Delta E_i^{IA} + \Delta E_i^{EA}\right) \quad (3)$$

Where, $\Delta E_i$, the total shifts in the binding energy, which represents the difference between the measured binding energy of the atom, $E_i$, and a reference binding energy, $E_i^0$, and can be attributed to several factors.

The binding energy of O 1s and Si 2p spectra significantly decreased after the substitution of Si by Co, but it is still difficult to identify the underlying effects caused by either the ground- or final-state effects, only based on the XPS analysis. For example, the substitution of Si by Co promotes the formation of Co(II)-O$_v$ pairs making Co(II) more electropositive, which probably results in enhancing the final-state relaxation of electrons toward O and Si atoms, increasing $\Delta E_i^{EA}$ in Equation 3 and decreasing the binding energy. The substitution could also contribute to the increase of the electron density at or around the O and Si atoms in the ground-state leading to the decrease of $$k\Delta q_i \text{ or } \Delta \sum_{k \neq j} \frac{q_j}{r_{ij}}$$

in Equation 3 and thus binding energy. Also, the substituted Co in the material will increase the average bond distances ($r_{Si(CN=4)}$=0.026 nm, $r_{Co(CN=6)}$=0.213 nm), which could result in the decrease of $$\Delta \sum_{k \neq j} \frac{q_j}{r_{ij}}$$

and the binding energy. Therefore, to explain the decrease of the binding energy by identifying the main contributors between the ground- and final-state effects, the complementary technique, XANES, was employed.

Figure 8A:
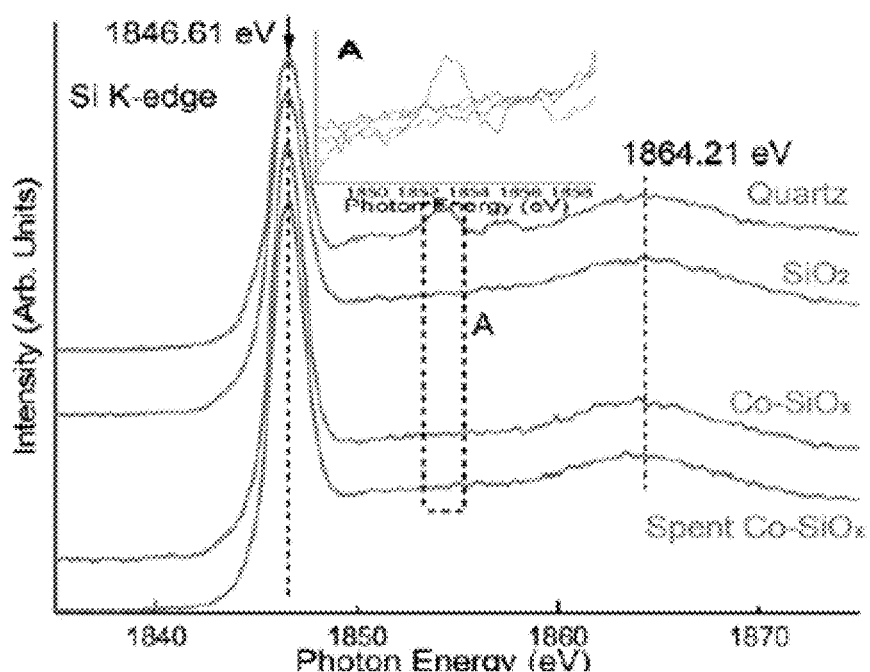
FIG. 8(A) is the XANES spectra of Si K-edge for the quartz, $SiO_2$, Co—SiOx, and spent Co—SiOx.

To explore more insights into the binding energy shifts in the XPS spectra, the XANES spectra of Si K-, O K-, Co K-, and Co L$_{2,3}$-edge were collected and analyzed. The Si K-edge XANES spectra of the quartz, SiO$_2$, Co—SiOx, and spent Co—SiOx are shown in FIG. 8(A). All these spectra show common peaks at 1846.61±0.1 and 1864.21±0.1 eV. The peak at 1846.61±0.1 eV is attributed to the transition of Si 1s electrons to the antibonding 3p-like states (t$_2$) according to the dipole selection rules. The peak at 1864.21±0.1 eV is assigned to the transition of Si 1s electrons to the t$_2$ states corresponding to the empty Si 3d states. Several smaller peaks are present in quartz in the range 1848 eV to 1860 eV, corresponding to different atomic shells within the crystal structure, which are absent in the SiO$_2$, Co—SiOx, and spent Co—SiOx (Inset A).

Figure 8B:
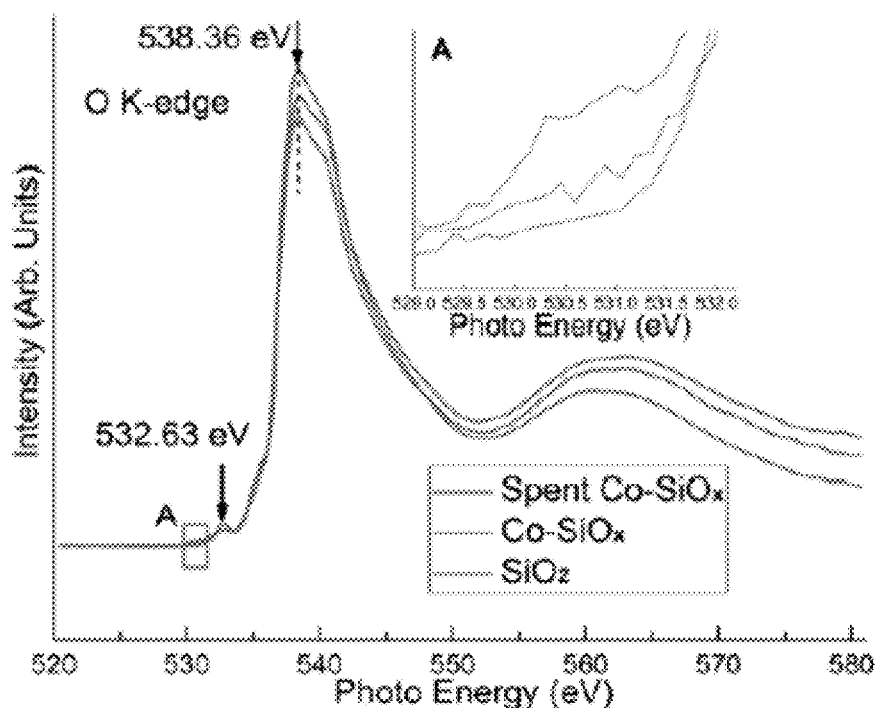
FIG. 8(B) is the XANES spectra of O K-edge for the $SiO_2$, Co—SiOx, and spent Co—SiOx.

This result reveals the amorphous nature of the SiO$_2$, Co—SiOx, and spent Co—SiOx compared to quartz. The O K-edge spectra (FIG. 8(B)) were also collected to investigate the changes in the electronic structure of these materials. The major peak in the SiO$_2$, Co—SiOx, and spent Co—SiOx centered at 538.36 eV, which is attributed to the transition of O 1s electrons to 2p electron states hybridized with the Si 3s and 3p states within the tetrahedrally coordinated SiO$_2$. The pre-edge peak located at 532.63 eV in all silicates is considered to originate from the transition of the O 1s electrons to the $\pi^*$ orbital states of $O_2$. Additionally, a bulge (Inset A) is found in the range of 530 to 532 eV for the Co—SiOx and spent Co—SiOx compared to the $SiO_2$, which likely results from the hybridization of O 2p with Co 3d states.

Figure 8C:
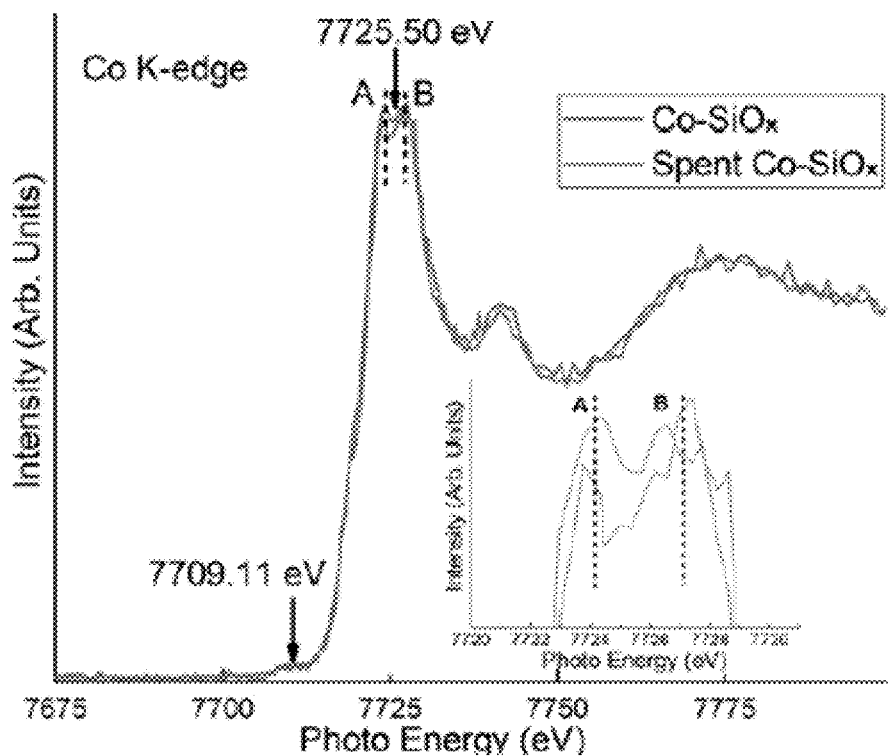
FIG. 8(C) is the XANES spectra of Co K-edge for the Co—SiOx and spent Co—SiOx.

The Co K-edge XANES spectra of the Co—SiOx and spent Co—SiOx are shown in FIG. 8(C). A pre-edge peak at 7709.11±0.1 eV, originated from Co 1s→3d transition, is a fingerprint for the octahedral symmetry of cobalt species. In general, the transition from Co 1s→3d is dipolar forbidden when the cobalt is stabilized in a centrosymmetric site. Therefore, the presence of pre-edge peak indicates that some cobalt species in the Co—SiOx and spent Co—SiOx are stabilized in a distorted octahedral symmetry or coordinatively unsaturated site, which suggests the presence of $O_v$. A comparison of the peak at 7725.50 eV in both the Co—SiOx and spent Co—SiOx with those of standard cobalt phases suggests that the average oxidation state of cobalt in both the Co—SiOx and spent Co—SiOx is slightly higher than two. The peak location of the spent Co—SiOx shows no significant change suggesting no change in the oxidation state compared to that of the Co—SiOx. A closer look at the main peak shows that the main peak is split into two (A and B, also shown in the inset). Peak A is slightly reduced in the spent Co—SiOx while Peak B increases, which is at the same location as the main peak for the cobalt oxides according to the literature. The main peak of $Co(OH)_2$ is at the same location as the Peak A for both the Co—SiOx and spent Co—SiOx. The reduction observed in the spent Co—SiOx can be explained by changes in the proportions of $Co(OH)_2$ and cobalt oxides.

Figure 8D:
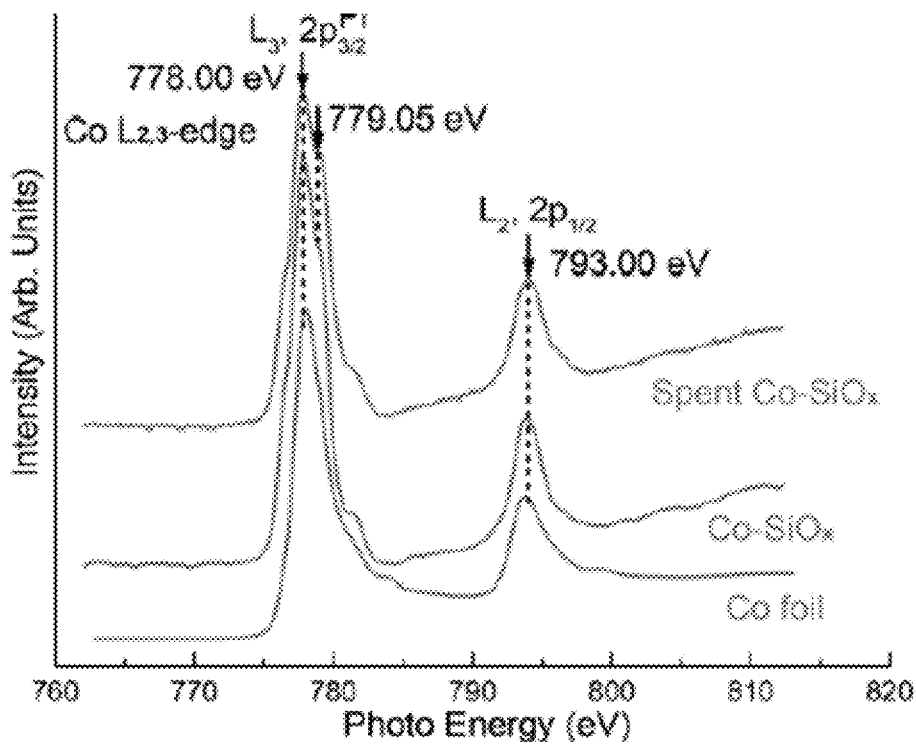
FIG. 8(D) is the XANES spectra of Co $L_{2,3}$-edge for the Co foil, Co—SiOx, and spent Co—SiOx.
Figure 9A:
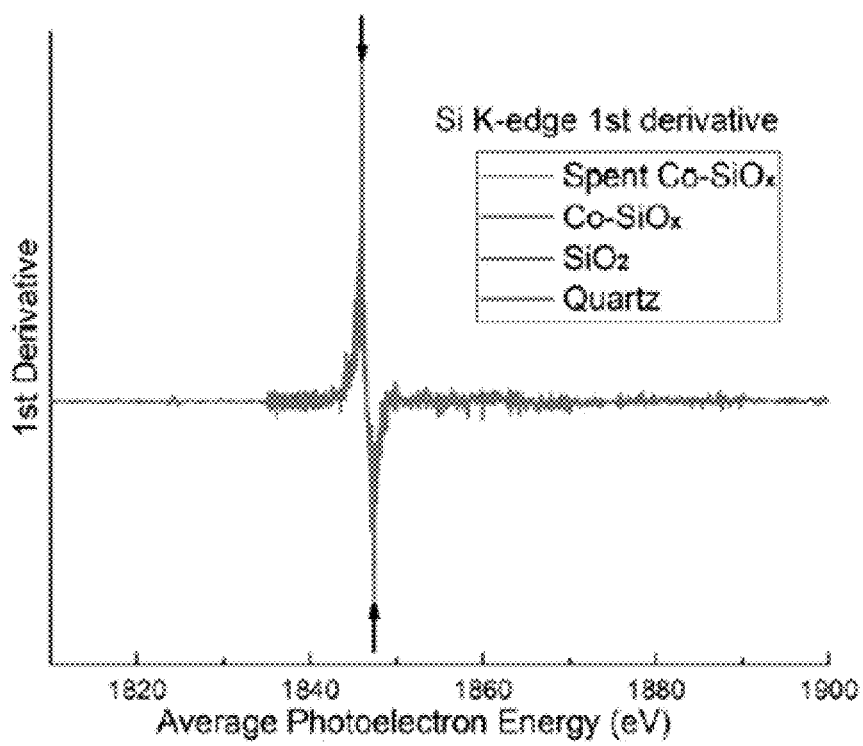
FIG. 9(A) is the XANES spectra of the first derivative for Si K-edge for the quartz, $SiO_2$, Co—SiOx, and spent Co—SiOx.
Figure 9B:
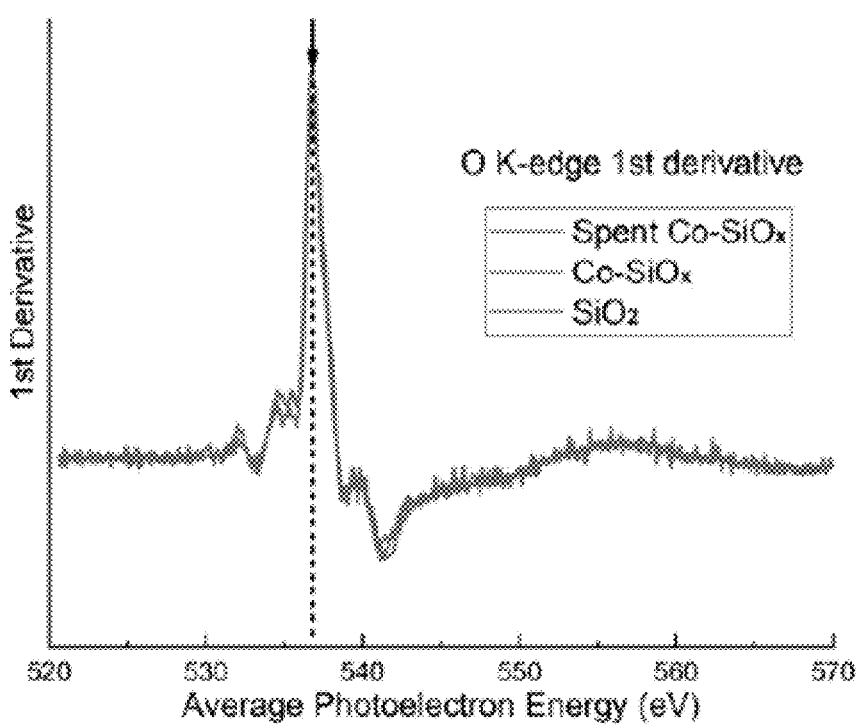
FIG. 9(B) is the XANES spectra of the first derivative for O K-edge for the $SiO_2$, Co—SiOx, and spent Co—SiOx.
Figure 9C:
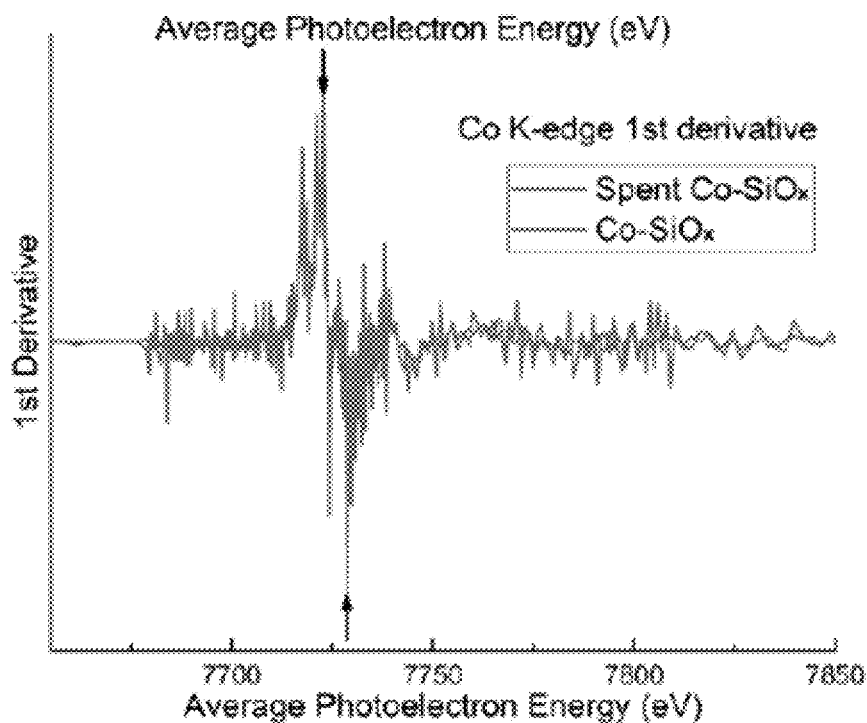
FIG. 9(C) is the XANES spectra of the first derivative for Co K-edge for the Co—SiOx and spent Co—SiOx.
Figure 9D:
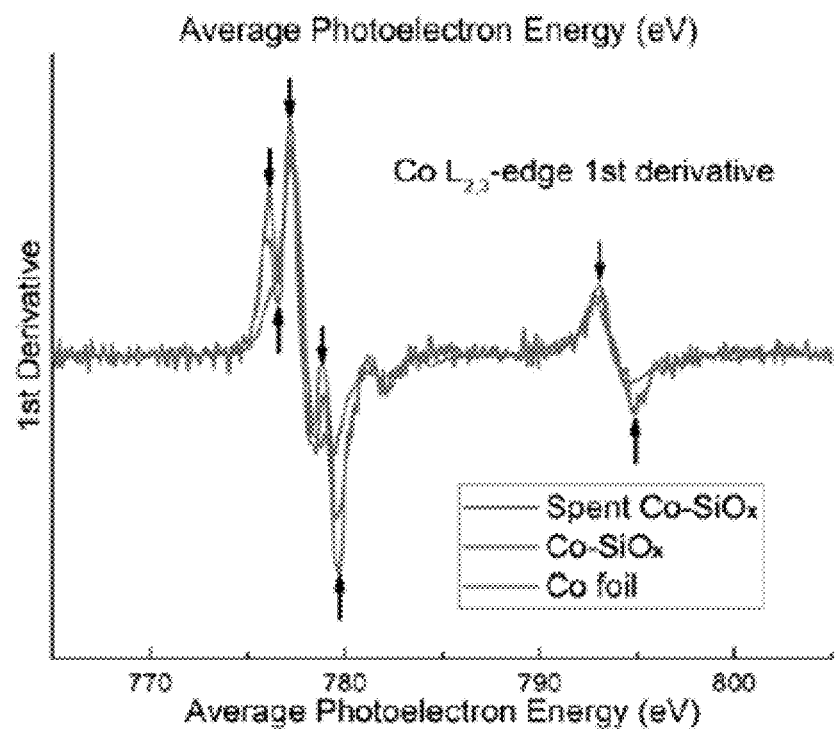
FIG. 9(D) is the XANES spectra of the first derivative for Co $L_{2,3}$-edge for the Co foil, Co—SiOx, and spent Co—SiOx.

The XANES spectra of the Co $L_{2,3}$-edge, along with the reference Co foil, were measured to probe the electronic bonding and structure of the Co—SiOx and spent Co—SiOx. FIG. 8(D) shows that the Co L-edge spectra consist of $L_3$ (~778 eV) and $L_2$ (~793 eV) spin-orbit split 2p-core level of Co, which are attributed to the electronic transitions from the initial states of Co $2p_{3/2}$ and $2p_{1/2}$ core electrons into the unoccupied 3d orbital of Co, respectively. The octahedral symmetry of Co splits the Co 3d energy level into a relatively low energy level of $t_{2g}$ and a high energy level of $e_g$. The excitation of electrons from the ground state 2p of Co(II) and Co(III) to $t_{2g}$ orbital can be expressed by the possible final states configurations as $2p^6 3d^7 (t_{2g}^{3\uparrow 2\downarrow} e_g^{2\uparrow}) \rightarrow 2p^5 3d^8 (t_{2g}^{3\uparrow 3\downarrow} e_g^{2\uparrow})$ and $2p^6 3d^6 (t_{2g}^{3\uparrow 2\downarrow} e_g^{1\uparrow}) \rightarrow 2p^5 3d^7 (t_{2g}^{3\uparrow 2\downarrow} e_g^{2\uparrow})$, respectively. Compared to the $L_{2,3}$-edge of Co foil, the $L_{2,3}$-edge spectra of the Co—SiOx and spent Co—SiOx display shoulders on the left and right side of the main $L_3$ edge indicating the different oxidized states for Co. The shoulders on the left side and right side indicate the low oxidized states (+2) and the high oxidized states (+3) for Co, respectively. Besides, the shoulder residing at the higher energy (~779 eV) in the spent Co—SiOx exhibits slightly higher intensity compared to that of the Co—SiOx thus indicating that the spent Co—SiOx has the higher oxidized Co(III) than the Co—SiOx. It can be presumed that the spent sample might be insignificantly more oxidized from Co(II) to Co(III) at the surface region and/or have some variations in its crystal symmetry, which agrees with the XPS results.

XANES absorption energies are also extremely sensitive to the ground state energies. Therefore, any shifts in Si K- and O K-edge absorption energies would sensitively signal the changes in ground-state energies with the Si substitution by Co. The absorption energies were determined by the maximum in the first derivative as shown in FIG. 9. The absorption energies of Si K-edge (FIG. 9(A)) and O K-edge spectra (FIG. 9(B)) show no changes that exceed the limits of instrumental precision (±0.1 eV) when the Co is loaded, indicating that the Si and O ground state energies are inactive to the loading of Co. Similarly, the absorption energies of Co K- (FIG. 9(C)) and $L_{2,3}$-edge (FIG. 9(D)) also exhibit changes. These suggest that the substitution of Si by Co does not cause a net change in the ground state core-level energies of Si, O, and Co, implying that the ground state effects are not the main contributor to the binding energy shifts found in XPS results.

Thus, the changes in extra-atomic final state relaxation ($\Delta E_i^{EA}$) are the major cause of the binding energy shifts. Additionally, the change in the coordination number (CN) of the atom can cause a change in the magnitude of electrons relaxation. However, the CN effects on the magnitude of electrons relaxation are negligible because the absorption energies are unchanged, although the average CN of Si/Co sites increases after the Si substitution by Co. (With the Co—SiOx and spent Co—SiOx, the average CN for Si is 4, and for Co, it is roughly 6 owing to the presence of the distorted octahedral symmetry or coordinatively unsaturated site for Co). Thus, the binding energy shifts are mainly caused by the extra-atomic final state relaxation ($\Delta E_i^{EA}$) probably resulting from the formation of $Co(II)-O_v$ pairs as the Si is substituted by Co. The results of XPS and XANES clearly point out the presence of more surficial $O_v$ in the Co—SiOx than the $SiO_2$.

Figure 10:
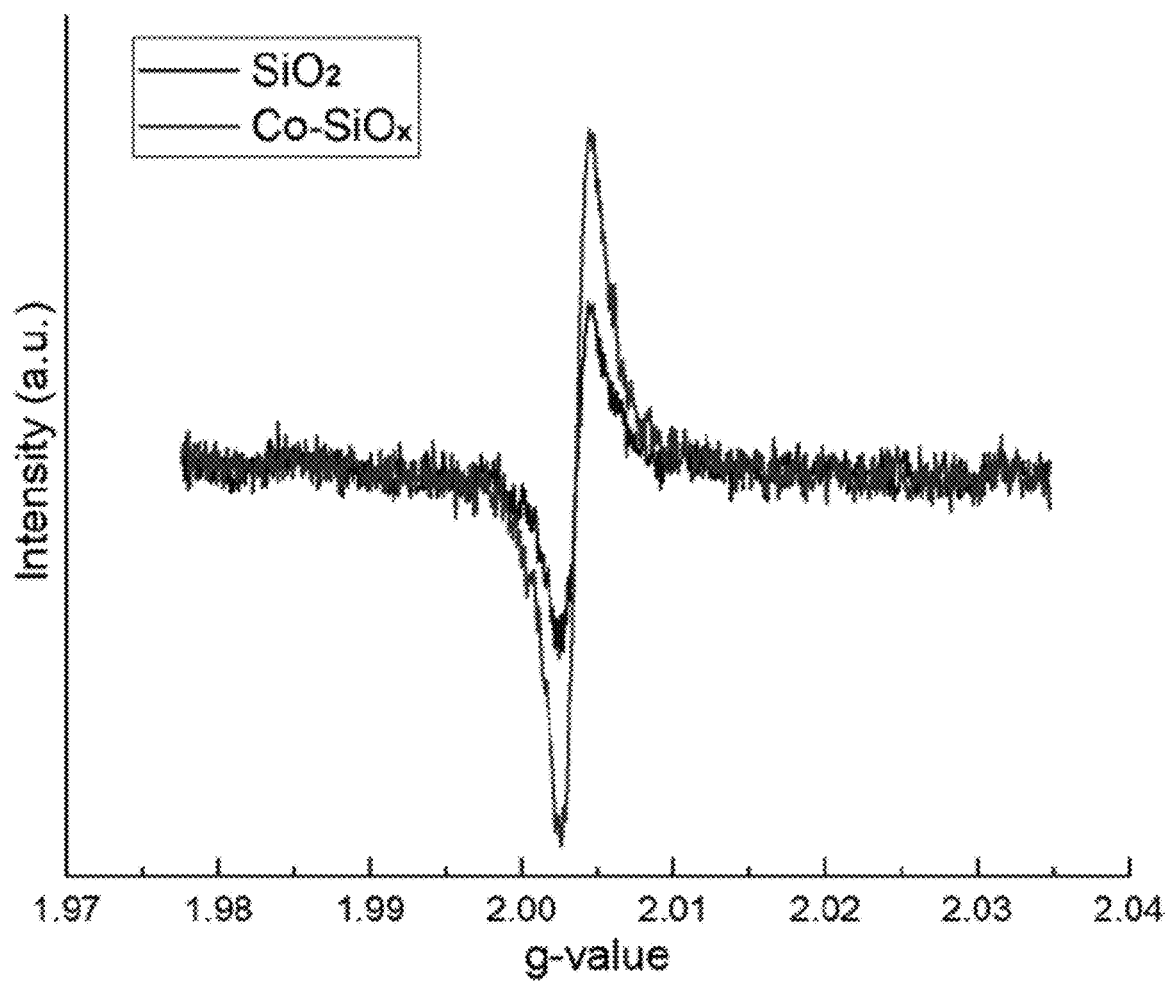
FIG. 10 is a depiction of EPR spectra of g-value of $SiO_2$ and Co—$SiO_2$.

Moreover, the EPR spectra also confirm this conclusion. As shown in FIG. 10, the EPR spectra signals at a g-value of 2.003 originated from the electrons trapped on the $O_v$. The EPR signal intensity of the Co—SiOx is much higher than that of the $SiO_2$, indicating more $O_v$ existing in the Co—SiOx. The $Co(II)-O_v$ pairs in the Co—SiOx exhibit a less electronegativity serving as electron donors and acceptors during catalytic activities. Thus, the $Co(II)-O_v$ pairs formed via Si substitution by Co(II) decrease the average electronegativity of Co/Si sites resulting in a less tightly bonded electron density or incompact electron density. Consequently, this incompact electron density in the chemical environment surrounding the absorbing atom drives to a greater extent of relaxation around the core-hole produced during the XPS measurement, which enhances the extra-atomic final state relaxation ($\Delta E_i^{EA}$) decreasing the binding energy in XPS spectra The final state effects as the major driving cause of the decrease in binding energy can be expressed as a change in the magnitude of the $\Delta E_i^{EA}$ term in Equation 3, which reveals the changes in the extra-atomic final state relaxation.

Amorphous Co—SiOx with high specific surface areas and mesoporous structures can efficiently activate PMS and produce $SO_4^{\cdot-}$ due to the formation of $Co(II)-O_v$ pairs via the substitution of Si by Co. The inherent Co significantly change the electronic structure of O and Si atoms in the Co—SiOx via final state effects and increase the conductivity in terms of more effective electron transfers. The Co—SiOx functioned as a more effective oxidative catalyst for the faster degradation of 2,4-DCP compared with other reported catalysts and approaches for 2,4-DCP degradation. The simplicity of the synthetic procedures indicates that the conductive Co—SiOx could be utilized for the activation of PMS and other electrochemical applications on a wider scale.

For the purpose of understanding the AMORPHOUS COBALT-INHERENT SILICON OXIDE AS A CATALYST, references are made in the text to exemplary embodiments of a AMORPHOUS COBALT-INHERENT SILICON OXIDE AS A CATALYST, only some of which are described herein. It should be understood that no limitations on the scope of the invention are intended by describing these exemplary embodiments. One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

The invention claimed is:

1. A method for pollutant degradation comprising:
   contacting an amorphous cobalt-doped silicon dioxide catalyst with an aqueous solution, wherein the amorphous cobalt-doped silicon dioxide catalyst has a formula comprising $Co—SiO_x$, wherein x is greater than 2, wherein the cobalt of the amorphous cobalt-doped silicon dioxide catalyst has an oxidation state of greater than 2, wherein the amorphous cobalt-doped silicon dioxide catalyst has an average coordination number for Si of 4 and an average coordination number for Co of 6, and wherein the aqueous solution comprises a pollutant.

2. The method of claim 1, wherein the pollutant is 2,4-dichlorophenol.

3. The method of claim 1, wherein the amorphous cobalt-doped silicon dioxide catalyst comprises 54 wt % of oxygen, 38 wt % of silicon, and 6 wt % of cobalt.

4. A method for activating peroxynomonsulfate by applying an amorphous cobalt-inherent silicon dioxide catalyst.

5. The method of claim 1, wherein the amorphous cobalt-inherent silicon dioxide catalyst has a pore size distribution with a mean of 26.78 nm.

6. The method of claim 1, wherein the amorphous cobalt-inherent silicon dioxide catalyst has a surface area of 607.95 $m^2/g$.

7. The method of claim 1, wherein the amorphous cobalt-doped silicon dioxide catalyst has a pore volume of 2.70 $cm^3/g$.

8. The method of claim 1, wherein the aqueous solution has a pH from 2 to 9.

9. The method of claim 2 further comprising:
   degrading the 2,4-dichlorophenol by about 100%.

* * * * *